US007248635B1

(12) United States Patent
Arneson et al.

(10) Patent No.: US 7,248,635 B1
(45) Date of Patent: Jul. 24, 2007

(54) METHOD AND APPARATUS FOR COMMUNICATING COMPUTER DATA FROM ONE POINT TO ANOTHER OVER A COMMUNICATIONS MEDIUM

(75) Inventors: Michael R. Arneson, Chippewa Falls, WI (US); Terrance L. Bowman, Sumner, WA (US); Frank N. Cornett, Chippewa Falls, WI (US); John F. DeRyckere, Eau Claire, WI (US); Brian T. Hillert, Chippewa Falls, WI (US); Philip N. Jenkins, Eau Claire, WI (US); Nan Ma, Chippewa Falls, WI (US); Joseph M. Placek, Chippewa Falls, WI (US); Rodney Ruesch, Eau Claire, WI (US); Gregory M. Thorson, Altoona, WI (US)

(73) Assignee: Silicon Graphics, Inc., Sunnyvale, CA (US)

( * ) Notice: Subject to any disclaimer, the term of this patent is extended or adjusted under 35 U.S.C. 154(b) by 942 days.

(21) Appl. No.: 09/620,373

(22) Filed: Jul. 20, 2000

(51) Int. Cl.
*H04B 3/00* (2006.01)
*H03H 7/38* (2006.01)

(52) U.S. Cl. .................. 375/257; 333/155; 333/32

(58) Field of Classification Search ................ 375/219, 375/220, 222, 257, 316, 377; 333/24 R, 333/28 R, 155, 32
See application file for complete search history.

(56) References Cited

U.S. PATENT DOCUMENTS

| 4,375,051 | A | 2/1983 | Theall | 333/17 |
|---|---|---|---|---|
| 4,477,713 | A | 10/1984 | Cook et al. | 219/124.34 |
| 4,514,749 | A | 4/1985 | Shoji | 357/68 |
| 4,587,445 | A | 5/1986 | Kanuma | 307/443 |
| 4,823,184 | A | 4/1989 | Belmares-Sarabia et al. | 358/27 |
| 4,926,066 | A | 5/1990 | Maini et al. | 307/303 |
| 5,194,765 | A | 3/1993 | Dunlop et al. | 307/443 |
| 5,295,132 | A | 3/1994 | Hashimoto et al. | 370/13 |

(Continued)

FOREIGN PATENT DOCUMENTS

JP 2003008427 * 1/2003

OTHER PUBLICATIONS

"Low Power Quad Differential Line Driver with Cut-Off", *National Semiconductor*, F100K ECL 300 Series Databook and Design Guide, pp. 2-54-2-60, (1992).

(Continued)

*Primary Examiner*—Young T. Tse
(74) *Attorney, Agent, or Firm*—Schwegman, Lundberg, Woessner & Kluth, P.A.

(57) ABSTRACT

The present invention is directed toward a communications channel comprising a link level protocol, a driver, a receiver, and a canceller/equalizer. The link level protocol provides logic for DC-free signal encoding and recovery as well as supporting many features including CRC error detection and message resend to accommodate infrequent bit errors across the medium. The canceller/equalizer provides equalization for destabilized data signals and also provides simultaneous bi-directional data transfer. The receiver provides bit deskewing by removing synchronization error, or skewing, between data signals. The driver provides impedance controlling by monitoring the characteristics of the communications medium, like voltage or temperature, and providing a matching output impedance in the signal driver so that fewer distortions occur while the data travels across the communications medium.

27 Claims, 20 Drawing Sheets

U.S. PATENT DOCUMENTS

| | | | |
|---|---|---|---|
| 5,315,175 A | 5/1994 | Langner | 307/443 |
| 5,394,528 A | 2/1995 | Kobayashi et al. | 395/325 |
| 5,416,606 A | 5/1995 | Katayama et al. | 358/467 |
| 5,428,806 A * | 6/1995 | Pocrass | 710/104 |
| 5,481,567 A | 1/1996 | Betts et al. | 375/261 |
| 5,490,252 A | 2/1996 | Macera et al. | 395/200.1 |
| 5,502,733 A | 3/1996 | Kishi et al. | 714/748 |
| 5,506,953 A | 4/1996 | Dao | 395/166 |
| 5,544,203 A | 8/1996 | Casasanta et al. | 375/376 |
| 5,603,056 A | 2/1997 | Totani | 395/828 |
| 5,604,450 A | 2/1997 | Borkar et al. | 326/82 |
| 5,617,537 A | 4/1997 | Yamada et al. | 395/200.01 |
| 5,631,611 A | 5/1997 | Luu et al. | 333/17.3 |
| 5,657,346 A | 8/1997 | Lordi et al. | 375/224 |
| 5,682,512 A | 10/1997 | Tetrick | 395/412 |
| 5,748,547 A | 5/1998 | Shau | 365/222 |
| 5,760,620 A * | 6/1998 | Doluca | 327/112 |
| 5,778,308 A | 7/1998 | Sroka et al. | 455/115 |
| 5,778,429 A | 7/1998 | Sukegawa et al. | 711/129 |
| 5,784,706 A | 7/1998 | Oberlin et al. | 711/202 |
| 5,793,259 A | 8/1998 | Chengson | 331/78 |
| 5,811,997 A | 9/1998 | Chengson et al. | 327/112 |
| 5,828,833 A | 10/1998 | Belville et al. | 395/187.01 |
| 5,844,954 A | 12/1998 | Casasanta et al. | 375/373 |
| 5,847,592 A | 12/1998 | Gleim et al. | 327/403 |
| 5,898,729 A | 4/1999 | Boezen et al. | 375/259 |
| 5,915,104 A | 6/1999 | Miller | 395/309 |
| 5,929,717 A | 7/1999 | Richardson et al. | 333/17.3 |
| 5,978,953 A | 11/1999 | Olarig | 714/768 |
| 6,005,895 A | 12/1999 | Perino et al. | 375/288 |
| 6,016,553 A | 1/2000 | Schneider et al. | 714/21 |
| 6,181,912 B1 * | 1/2001 | Miller et al. | 455/12.1 |
| 6,259,737 B1 * | 7/2001 | Fung et al. | 375/240.16 |
| 6,272,651 B1 | 8/2001 | Chin et al. | 714/43 |
| 6,310,815 B1 | 10/2001 | Yamagata et al. | 365/230.03 |
| 6,363,502 B1 | 3/2002 | Jeddeloh | 714/52 |
| 6,412,056 B1 | 6/2002 | Gharachorloo et al. | 711/202 |
| 6,463,548 B1 * | 10/2002 | Bailey et al. | 713/503 |
| 6,487,685 B1 | 11/2002 | Fiske et al. | 714/701 |
| 6,573,764 B1 * | 6/2003 | Taylor | 327/108 |
| 6,597,731 B1 * | 7/2003 | Shuholm | 375/220 |

OTHER PUBLICATIONS

"The SA27 library includes programmable delay elements DELAYMUXO and DELAYMUXN. How are these cells used?", *IBM Delaymuxn Book*, pp. 1-6, (Feb. 1999).

Djordjevic, A.R., et al., "Time Domain Response of Multiconductor Transmission Lines", *Proceedings of the IEEE*, 75(6), 743-64, (Jun. 1987).

Im, G., et al., "Brandwidth-Efficient Digital Transmission over Unshielded Twisted-Pair Wiring", *IEEE Journal on Selected Areas in Communications*, 13(9), 1643-1655, (Dec. 1995).

Mooney, R., et al., "A 900 Mb/s Bidirectional Signaling Scheme", *IEEE Journal of Solid-State Circuits*, 30(12), 1538-1543, (Dec. 1995).

Takahashi, T., et al., "110GB/s Simultaneous Bi-Directional Transceiver Logic Synchronized with a System Clock", *IEEE International Solid-State Circuits Conference*, 176-177, (1999).

*Lattice Semiconductor Corporation*, http://www.latticesemi.com, (2002), 7 pgs.

"Dynamic Datapath Selection for Unpredictable Transger Starts", *IBM Technical Disclosure Bulletin*, TBA-ACC-NO: NA9402589, Issue No. 2A, Cross Reference: 0018-8689-37-2A-589, (1994), 589-592.

"Dynamic Switch to Data Slow Mode on a Memory Card", *IBM Technical Disclosure Bulletin*, 37, NA9402637, (1994), 321-322.

"Memory Card Data Fastpath", *IBM Technical Disclosure Bulletin*, 37, TDB-ACC-NO: NA9402637, Issue No. 2A, Cross Reference: 0018-8689-37-2A-637, (1994), 637-638.

Brewer, Kevan, "Re: Memory mapped registers", (Online): comp.arch.embedded, (May 2, 1996).

Gjessing, et al., "Performance of the RamLink Memory Achritecture", *Proceedings HICSS'94*, (1994), 154-162.

Gjessing, Stein, et al., "RamLink: A High-BandwidthPoint-to-Point Memory Architecture", *Proceeding CompCon*, (1992), 328/331.

IEEE STD, "IEEE Standard for High-Bandwidth Memory Interface Based on Scalable Coherent Interface(SCI) Signaling Technology (RAMLink)", *IEEE Std 1596.4-1996*, (1996), 1-91.

Rao, A., "Memory mapped registers", new://comp.arch.ambedded, (Apr. 27, 1996).

* cited by examiner

METHOD AND APPARATUS FOR COMMUNICATING COMPUTER DATA FROM ONE POINT TO ANOTHER OVER A COMMUNICATIONS MEDIUM

STATEMENT OF RIGHTS IN INVENTION

The United States Government has rights to use this invention pursuant to subcontract B338314 issued by the University of California, which operates Lawrence Livermore National Laboratory for the United States Department of Energy under Contract No. W-7405-ENG-48.

FIELD OF THE INVENTION

The present invention relates to methods and apparatuses for communicating data across a communications medium; and, in particular to a system and method for communicating between asynchronous devices.

BACKGROUND

In the communications industry, the need for faster communication between computer elements is ever increasing. As can be appreciated by the rapid advancements in processor speeds, there is also a need to increase the speed of communicating data across computer systems. However, prior systems have proven limited in their capabilities. The traditional methods of increasing speeds include increasing signal rates or increasing the number of wires used in a communications medium. Increasing signal rates, however, means increasing the speeds of all the electronic components in the communications path. In addition, signal bandwidth must be increased, leading to more distortion in the communications medium. Furthermore, increasing the number of wires creates additional expense in manufacturing, decreases reliability and adds unwanted bulk or stiffness to the communications medium.

There have been some attempts to increase the speed of communications mediums without increasing signal rates or adding more wires. For instance, systems have provided for unidirectional data transfer in both directions on a data bus; the data transfer, however, did not occur in both directions simultaneously, only in one direction at a time. If only the data could be transmitted in both directions at the same time, then the rate of data transfer over a communications medium could significantly increase without having to increase the signal rate or without having to add more bulky and expensive wires.

Previous approaches are not only limited in the speed of data transfer, but also in the cost-efficiency of transmitting data signals across communication mediums. For instance, state of the art communication mediums require that wires be highly toleranced to avoid signal distortions. However, high tolerancing is an expensive manufacturing cost. If there was a way of reducing signal distortion in the communications medium without having to rely on high tolerances, then a great deal of cost could be eliminated from the manufacturing of communications mediums.

SUMMARY OF THE INVENTION

The present invention provides solutions to the above mentioned limitations in previous communications systems. Several embodiments are provided below of a communications channel having a link level protocol, a driver, a receiver, and a canceller/equalizer.

The link level protocol provides logic for DC-free signal encoding and recovery. In addition, the link level protocol supports features such as CRC error detection and message resend in order to accommodate bit errors in transfers across the communications medium. The canceller/equalizer provides equalization of the data signal that may have occurred in the medium and also provides for simultaneous bi-directional data transfer, thus allowing for clearer and faster data transfer without increasing the signal rate or the number of wires in the communications medium.

In one embodiment, the receiver provides bit deskewing by removing synchronization error, or skewing, between data signals after they have passed through a communications medium. In another embodiment, the driver provides impedance controlling by monitoring the characteristics of the communications medium, like voltage or temperature, and providing a matching output impedance in the signal driver so that fewer distortions occur while the data travels across the communications medium. In yet another embodiment both bit deskewing and impedance controlling are present. The bit deskewer and the impedance controller improve the clarity of signals without having to highly tolerance the wires in the communications medium.

In another embodiment, the invention is directed toward a communications medium consisting of a processor and a transceiver comprising a link level protocol, a driver, a receiver, and a canceller/equalizer. And, in yet another embodiment, the invention is described as a plurality of processors communicating via transceivers comprising link level protocols, drivers, receivers, and canceller/equalizers.

In another embodiment, the invention is directed to a method for driving an output signal as a function of a first signal, receiving a second signal from the communications medium, combining the first and second signals to extract a receive signal, and deskewing the receive signal.

DETAILED DESCRIPTION OF THE INVENTION

The following detailed description describes the present invention in sufficient detail to enable those skilled in the art to understand and utilize the invention. However, it must be understood that other embodiments exist, and that logical changes may be made to the various embodiments of the invention without departing from the spirit and scope of the present invention. Therefore, the following detailed description is not to be taken in a limiting sense, and the scope of the present invention is defined only by the claims.

Figure 1:
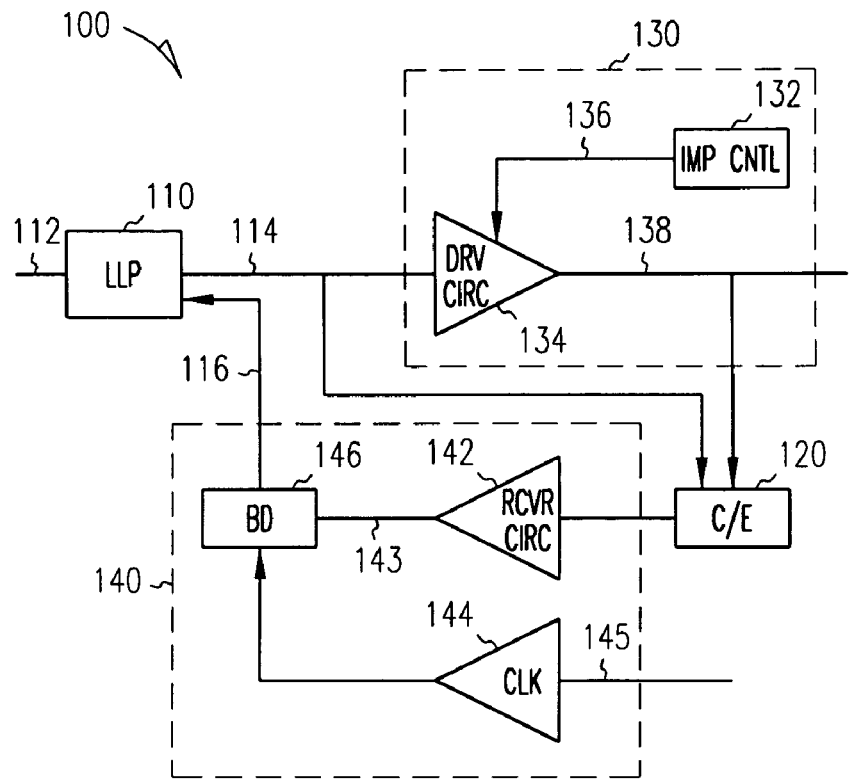
FIG. 1 is a block diagram of a transceiver according to one embodiment of this invention.

FIG. 1 is a block diagram of a communications transceiver 100 according to one embodiment of the present invention. The communications transceiver 100 includes a link level protocol (LLP) 110, a driver 130, a canceller/equalizer 120, and a receiver 140.

Link level protocol 110 provides a uniform interface to transceiver 100, as is generally understood in the art. Link level protocol 110 includes an input/output 112, a driver line 114 connected to driver 130, and a receiver line connected to receiver 140. The link level protocol 110 is used as an exemplary protocol for many reasons. For instance, link level protocol 110 allows for a DC-free signal encoding and recovery over a communications channel. Link level protocol 110 also allows for some degree of asynchronous clocking out of the receiver 140. In one embodiment, link level protocol 110 supports features such as cyclic redundancy check (CRC) error detection and message resend to accommodate bit errors in data transfers across the communication channel.

In one embodiment, link level protocol 110 packages data and allows for data packet framing. The link level protocol 110 computes the CRC for packages the transceiver 100 transmits and checks the CRC for packets it receives. Furthermore, the link level protocol 110 detects the life of another link level protocol to which it is connected and restarts a data transmission if no life is detected from a connecting device or if a connection is lost to that device. In addition, the link level protocol 110, when used in embodiments of the present invention, enables special deskew training signals from the receiver 140.

The driver 130 includes a driver circuit 134 and an impedance controller 132. The impedance controller 132 connects to driver circuit 134 via an impedance controller line 136. The impedance controller 132 continuously monitors the impedance of the communication channel by monitoring signals representing voltage, temperature, or other variation or process characteristics of the communications medium. The impedance controller 132 then interacts with the driver circuit to automatically drive a signal through the driver output 138 with an output impedance matching that of the communication medium. For more specific details on how the impedance controller works, see "Impedance Controller" U.S. Pat. No. 6,703,908, Issued, Mar. 9, 2004, which is incorporated by reference.

The canceller/equalizer 120 connects to the driver 130 via the driver output 138 and receives a driver output signal. The canceller/equalizer 120 also receives signals coming off the driver line 114. "Compensated Canceller and Equalizer for Simultaneous Bi-directional Communications in a Computing System", U.S. patent application Ser. No. 09/441,774, describes a canceller/equalizer 120 which generates an equalized signal that is transmitted to receiver 140. The system and method of bi-directional communication described is incorporated herein by reference.

In one embodiment, canceller/equalizer 120 provides simultaneous bi-directional signaling across the communications channel. Although bi-directional signaling can conceivably occur at any rate, one embodiment of the particular canceller/equalizer discussed in "Compensated Canceller and Equalizer for Simultaneous Bi-directional Communications in a Computing System" is capable of simultaneously transmitting and receiving 40 data signals (4 Bytes) at a data rate of 3.2 GBytes per second in each direction on the communications medium, or 6.4 Gbytes per second composite. Although the canceller/equalizer 120 can transmit simultaneous bidirectionally, it can also transmit unidirectionally, at half the speed of simultaneous bi-directional communication. Of course, these are only a few of the general capabilities of the canceller/equalizer 120. For others, refer to "Compensated Canceller and Equalizer for Simultaneous Bi-directional Communications in a Computing System", U.S. patent application Ser. No. 09/441,774.

In one embodiment, receiver 140 receives the equalized signal from the canceller/equalizer output 121. The receiver includes a receiver circuit 142 connected to the canceller/equalizer output 121, a clock receiver 144 receiving a clock signal 145, and a bit deskew 146 connected to the receiver circuit line 143 and the receiver line 116. As described in "System and Method for Adaptively Deskewing Parallel Data Signals Relative to a Clock" U.S. patent application Ser. No. 09/476,678, the description of which is incorporated herein by reference, the bit deskew 146 continuously tracks data and continuously corrects skew among data lines in the communications medium. The bit deskew 146 can coarse tune or fine tune the received signal with a potential for up to 3.75 ns of deskew at an 800 Mb per second signaling rate. The bit deskew 146 can also center the clock signal on the clock line 145 received by the clock receiver 144. Of course, these are only a few of the general capabilities of the bit deskew 146. For others, refer to "System and Method for Adaptively Deskewing Parallel Data Signals Relative to a Clock" U.S. patent application Ser. No. 09/476,678.

Figure 2:
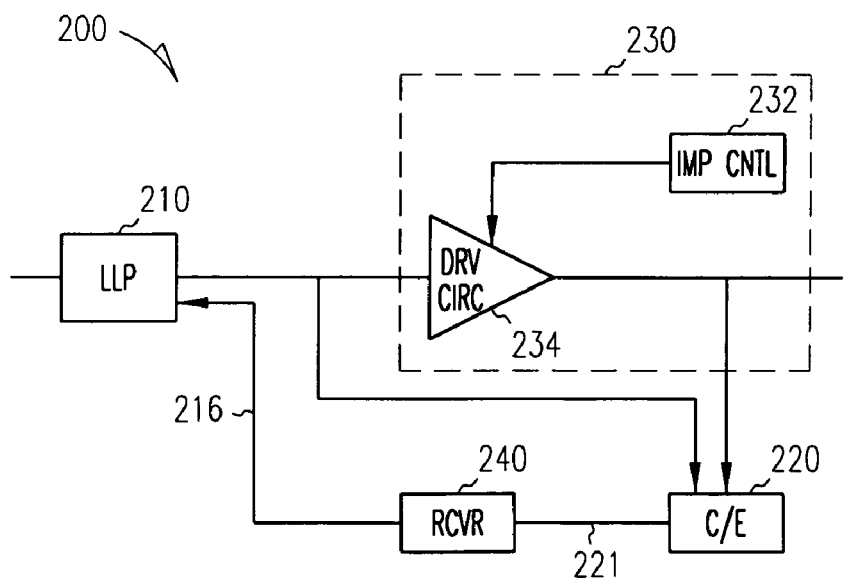
FIG. 2 is a block diagram of a transceiver according to another embodiment of this invention.

FIG. 2 shows another embodiment of a communications transceiver according to the present invention. In FIG. 2, transceiver 200 includes LLP 210, driver 230, canceller/equalizer 220, and receiver 240. In one embodiment, driver 230 includes an impedance controller 232 and a driver circuit 234. In the embodiment shown in FIG. 2, LLP 210, driver 230, and canceller/equalizer 220 are connected in the same manner as LLP 110, driver 130, and canceller/equalizer 120 of the embodiment of FIG. 1.

In the embodiment of FIG. 2, however, receiver 240 does not include a bit deskew circuit. The receiver 240 is connected to the canceller/equalizer 220 via the canceller/equalizer output 221 and is connected to the LLP 210 via the receiver line 216.

Figure 3:
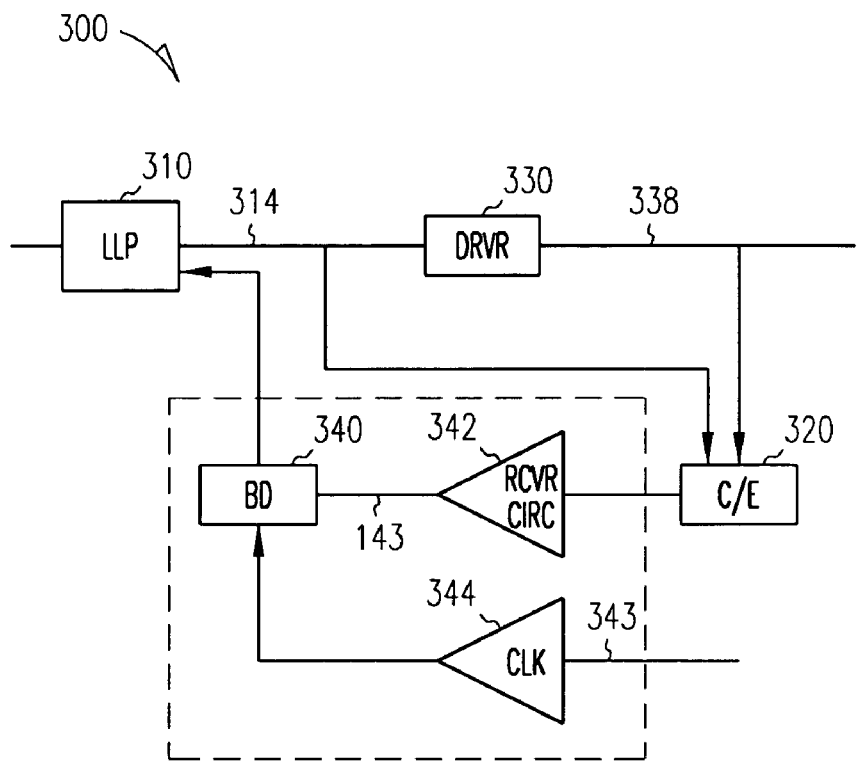
FIG. 3 is a block diagram of a transceiver according to yet another embodiment of this invention.

FIG. 3 shows yet another embodiment of a communications transceiver according to the present invention. In FIG. 3, transceiver 300 includes LLP 310, driver 330, canceller/equalizer 320, and receiver 340. In one embodiment, receiver 340 includes a receiver circuit 342, a bit deskew 346, and a clock receiver 344 receiving a clock signal 343. In the embodiment shown in FIG. 3, LLP 310, canceller equalizer 320, and receiver 340 are connected in the same manner as LLP 110, canceller/equalizer 120, and receiver 140 of the embodiment of FIG. 1. In the embodiment of FIG. 3, however, driver 330 does not include an impedance controller. The driver 330 is connected to LLP 310 via driver line 314 and is connected to the canceller/equalizer 320 via driver output 338.

Figure 4:
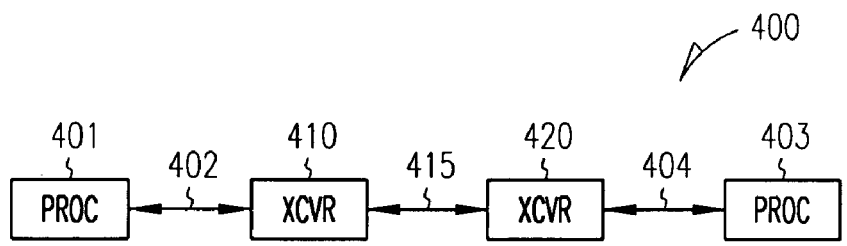
FIG. 4 is a block diagram of a communications medium utilizing transceivers according to the embodiments of this invention.

FIG. 4 shows a communications medium 400 having a first processor 401 and a second processor 403 connected to a communications channel 405. Channel 405 includes a first transceiver 410 and a second transceiver 420 connected to each other via a communications line 415. Processor 401 connects to transceiver 410 via processor line 402, and processor 403 connects to transceiver 420 via processor line 404. Transceivers 410 and 420 conceivably are any combination of transceivers 100, 200, or 300 described above and exemplified in FIGS. 1, 2, and 3 respectively.

Figure 5:
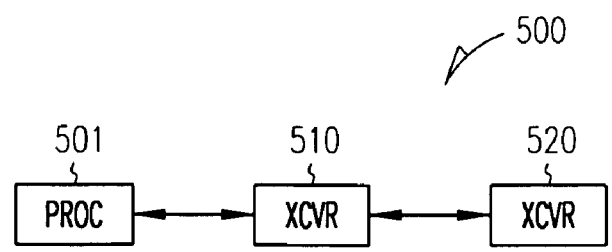
FIG. 5 is a block diagram of a communications medium utilizing one transceiver according to the embodiments of this invention.

FIG. 5 shows a communications medium 500 where only one of the transceivers 510 is transceiver 100, 200, or 300, and the transceiver 520 is another transceiver, or any other sort of communications device, that utilizes drivers and receivers and communicates data signals across a communications medium.

Figure 6:
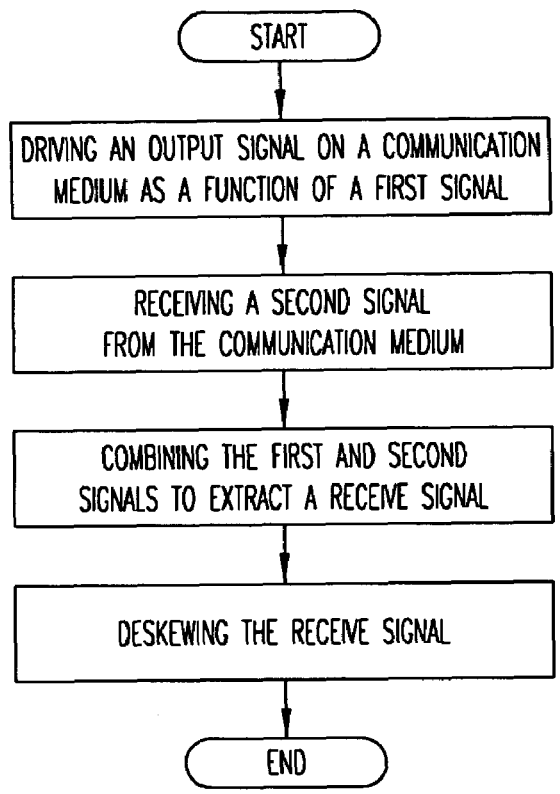
FIG. 6 is a flow diagram showing a method embodiment of this invention.

FIG. 6 depicts a method for transmitting data over a communications medium. It comprises driving an output signal as a function of a first signal, receiving a second signal from the communications medium, combining the first and second signals to extract a receive signal, and deskewing the receive signal. The term "driving" means modifying the output signal as a function of an external signal. The output signal is modified by increasing voltage swing of the output signal as a function of temperature, voltage, or some other line characteristic. The first and second signals are described as single signals, but could very well be series, sets, or groups of signals. The receive signal could also be a series, set, or group of signals.

Path Forward Source Synchronous Drivers and Receivers

The drivers and receivers of the present invention may transmit and receive data utilizing, what can be termed, Path Forward Source Synchronization. If so, driver 130, 230 or 330 may be called a Path Forward Source Synchronous Driver (PFSSD) and receiver 140, 240, or 340 may be called a Path Forward Source Synchronous Receiver (PFSSR). The sections below entitled "PFSSD" and "PFSSR" describe how to implement PFSSDs and PFSSRs into the embodiments of the present invention.

PFSSD

Figure 7:
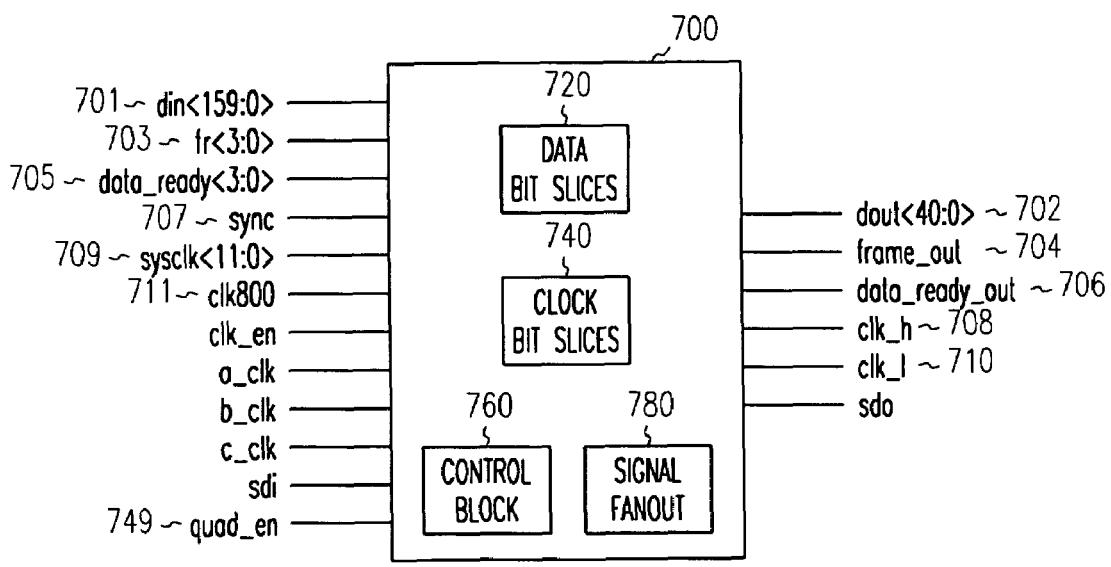
FIG. 7 is a block diagram showing signal inputs and outputs of a PathForward Source Synchronous Driver (PFSSD)

FIG. 7 is a block diagram of a PFSSD 700 comprising data bit slices 720, clock bit slices 740, control block 760, and signal fanout structure 780. The PFSSD 700 comprises 48 single bit slices. For compactness, single bit slices are packed together by 4s, thus creating 12 4-bit slices in the PFSSD 700. Of the 48 single bit slices, 42 are data bit slices 720 (dout<40:0> 702, frame_out 704, and data_ready_out 706), 2 are channel clock bit slices 740, (true channel clock, clk_h 708, and false channel clock, clk_1 710), and 4 are inactive bit slices that ensure the symmetric distribution of each slice inside the PFSSD 700. The PFSSD 700 further comprises a control block 760 and a fan out structure 780 for "Load" 724 and "Shift" 725 signals utilized by the data bits.

In one embodiment, PFSSD 700 performs 4 to 1 multiplexing on every 4 input data signals at 200 Mb/s to output one data signal at 800 Mb/s. The PFSSD 700 generates two handshake signals, frame_out 704 and data_ready_out 706, to be used by a PFSSR. The PFSSD 700 outputs 40 data bits, dout<40:0> 702, and is capable of performing 4×1 time multiplexing on 160 bits of input data, din<159:0> 701. It forwards a pair of complementary clocks, clk_h 708 and clk_1 710. The PFSSD 700 interfaces with the LLP 110 (FIG. 1), 210 (FIG. 2), 310 (FIG. 3) through input data, din<159:0> 701, an input signal indicating a data micropacket, data_ready<3:0> 705, an input signal indicating a data frame reference for AC encoding, fr<3:0> 703, and a reset/synchronization signal, sync 707. Data_ready<3:0> 705 is 4×1 time multiplexed by the PFSSD 700 and becomes data_ready out 706. It is used to indicate the start of valid data at the output of the PFSSD 700. Fr<3:0> 703 is also 4×1 time multiplexed to become frame_out 704. The PFSSD 700 has a last level of latches from the LLP built into itself. This effectively removes the asynchronous boundary between the core clocks (200 Mhz), sysclk<11:0> 709, and the high speed channel (800 Mhz), clk800 711, inside the PFSSD 700. A last level fanout structure of the core clock that powers those latches are also included in the PFSSD 700, namely a clock splitter. The input to the clock splitter, a 200 Mhz clock, comes from the LLP. Each core clock, except sysclk<11>, drives two clock splitters, and each splitter drives eight low power L2 latches. The synchronization between the 200 Mhz core clocks and the 800 Mhz high speed clock is done by the synchronization signal, sync 707, from the LLP. Sync 707 is initially set low; after the system powers up, the LLP will cause a rising edge on sync 707. This rise edge is used to set the correct timing between the 200 Mhz domain of the LLP and the 800 Mhz domain of the PFSSD 700. This rising edge is required to represent the latest timing of all input data bits including data_ready<3:0> 705 and fr<3:0> 703. Thus, all input data bits including data_ready<3:0> 705 and fr<3:0> 703 must arrive at the input of the PFSSD 700 within one core clock period from the LLP; the maximum core clock skew should be within 400 ps; and sysclk<11> should be the latest arrival core clock as it is used to launch the sync 707 signal inside the PFSSD 700.

Figure 7A:
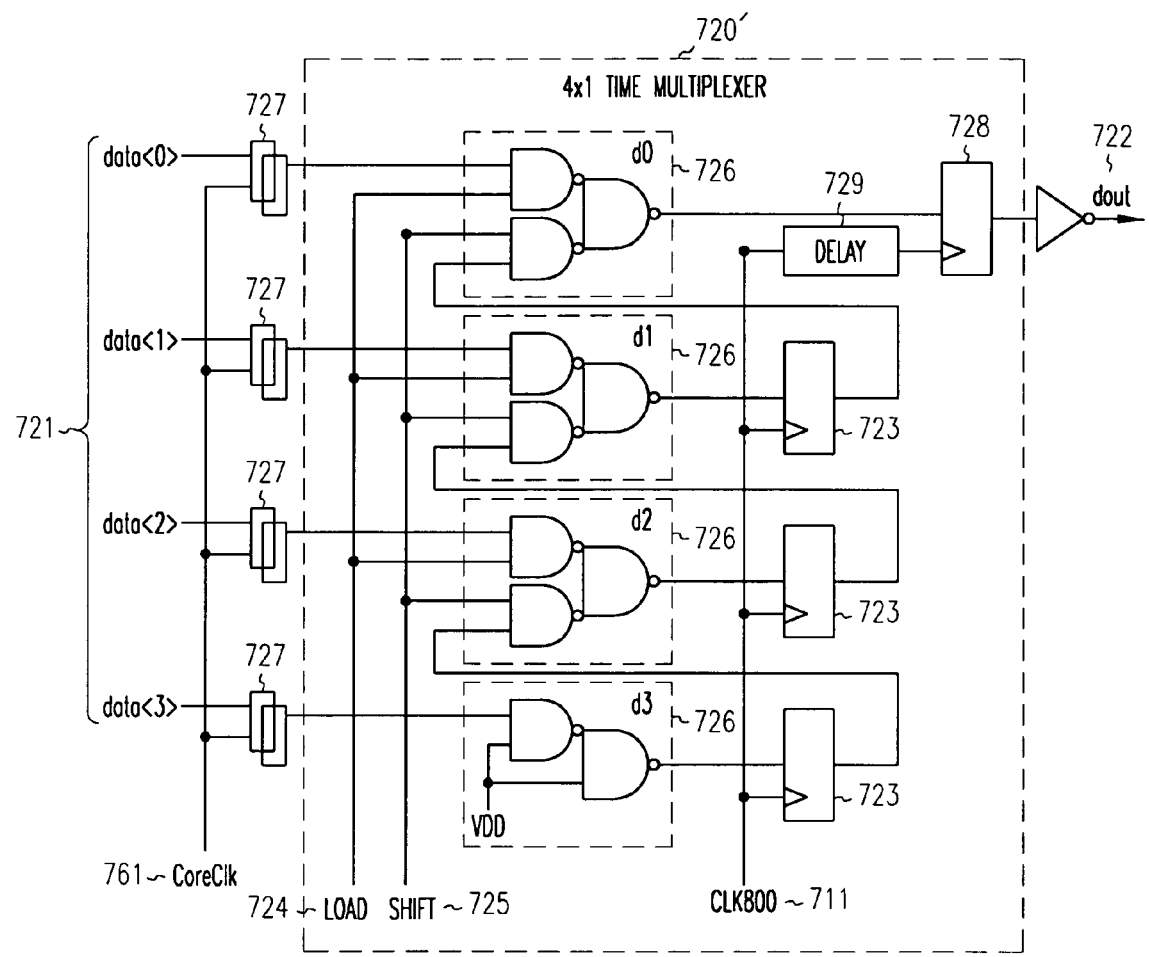
FIG. 7A is a diagram showing a single data bit of the PFSSD of FIG. 7.

FIG. 7A is a schematic representation of a PFSSD single data bit 720' producing a data output, dout 722. The data bit 720' multiplexes 4 input data signals, data<3:0> 721. All 4 input data signals first go through L2 type latches 727 from the last level of the LLP. The 4×1 time multiplexer is made up of 4 high performance flops 723 and input data to each flop has a 2×1 multiplexer 726 consisting of nand gates. Because the 2×1 multiplexer is made up of nand gates, both a select signal, Load 724, and its complement, Shift 725, are required. When Load 724 is high, all four input data signals are loaded in parallel into the flops 723; when Shift 725 is high, the data is shifted serially into the flops 723 starting from the lowest flop upward toward the output flop.

Figure 7B:
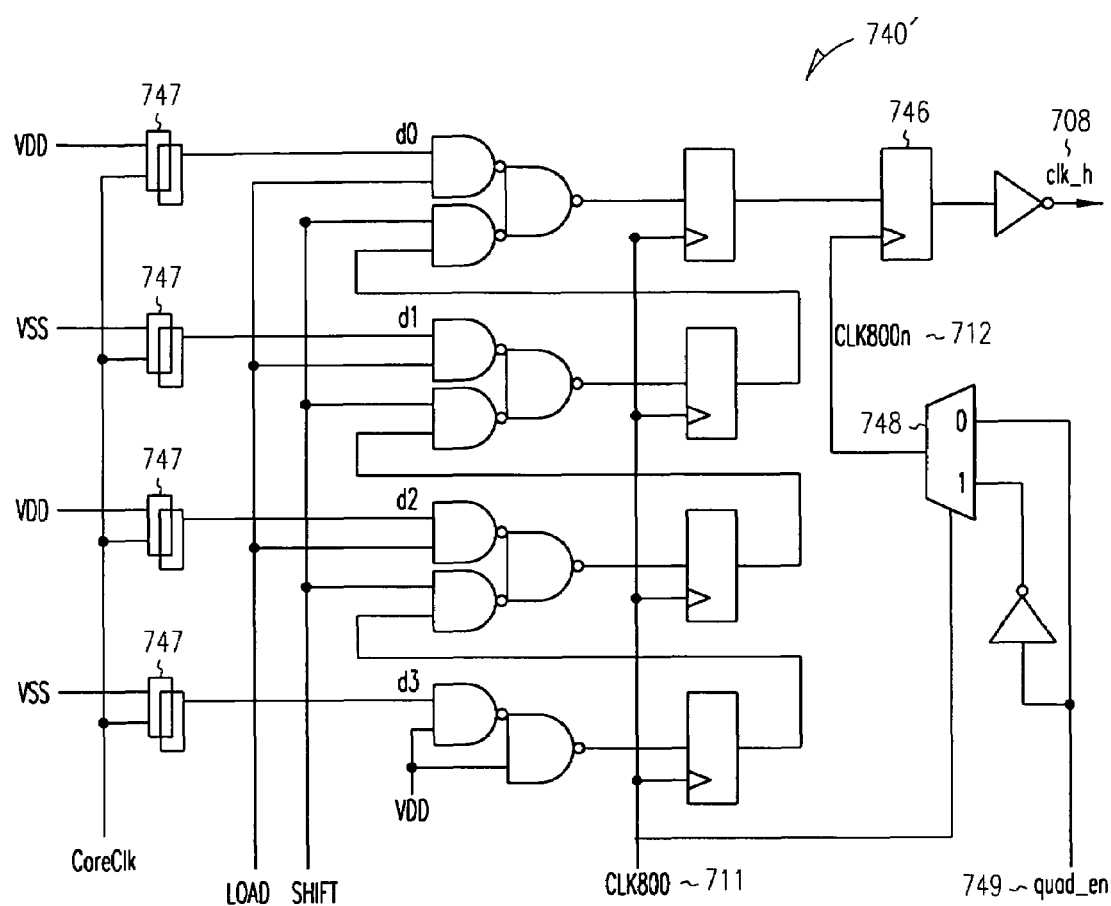
FIG. 7B is a diagram showing a single clock bit of the PFSSD of FIG. 7.

FIG. 7B shows a schematic representation of a PFSSD single clock-bit 740' producing a true channel clock, clk_h 708. In comparison, the clock-bit 740' of FIG. 7B resembles the data-bit 720' of FIG. 7A, but the clock-bit 740' has one extra flop 746 with a clock pin that must go through a clock gating structure 748, supporting a quadrature clock option, quad_en 749. When quad_en 749 is high, CLK800$n$ 712 becomes the negative of CLK800 711, causing clk_h 708 to be 90 degrees out of phase with respect to all data output bits (dout<40:0> 702), data_ready_out 706, and frame_out 704. When quad_en 749 is low, CLK800$n$ 712 becomes the delayed version of CLK800 711, and because of the extra flop, clk_h 708 will be one cycle later than the output bits. Hence the need for the DELAY element 729 of FIG. 7A to match the one cycle delay. The false channel clock, clk_1 710, is generated in the same way as clk_h 708, except the input to all 4 latches 747 is reversed. Note, PFSSD output signals (data output, data_ready_out 706, frame_out 704, clk_h 708, and clk_1 710) have to be routed to corresponding 10 cells. The estimated distance from the PFSSD to all IOs is between four to five millimeters. To ensure routability and preserve symmetry between rising and falling edges of all the output signals, an inverting clock driver is used inside the PFSSD, causing all output signals to be complemented. Another set of inverting clock drivers should be placed between the PFSSD and all corresponding IO cells to rebuffer the signal and correct the complemented signals due to the first inverting clock driver.

Figure 7C:
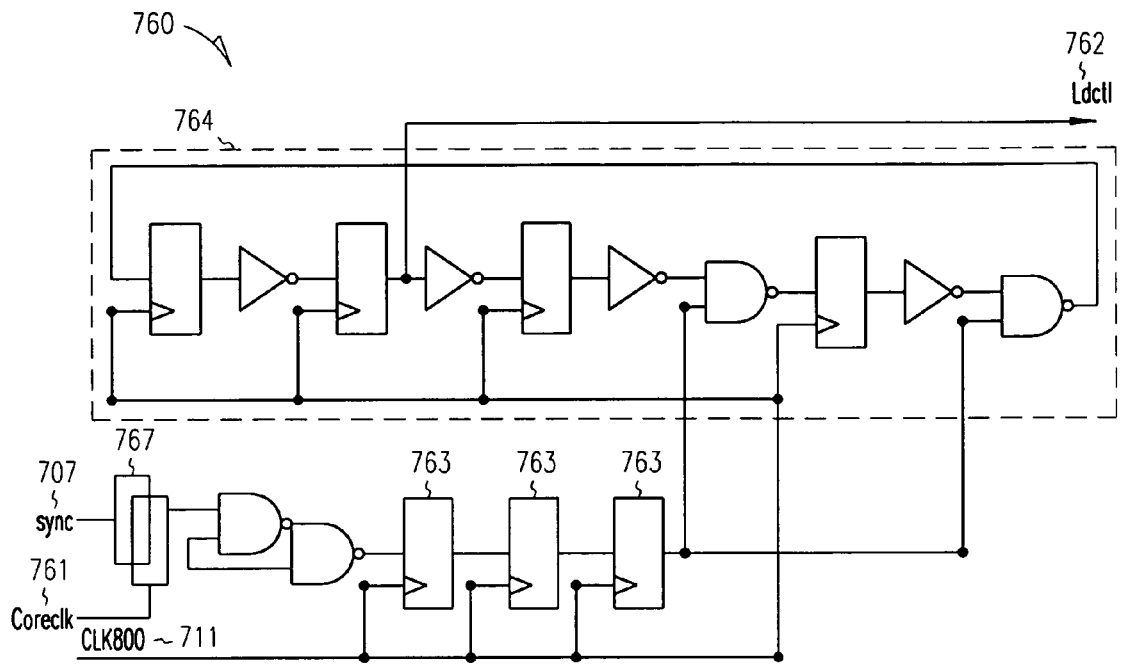
FIG. 7C is a diagram showing the control block of FIG. 7.
Figure 7D:
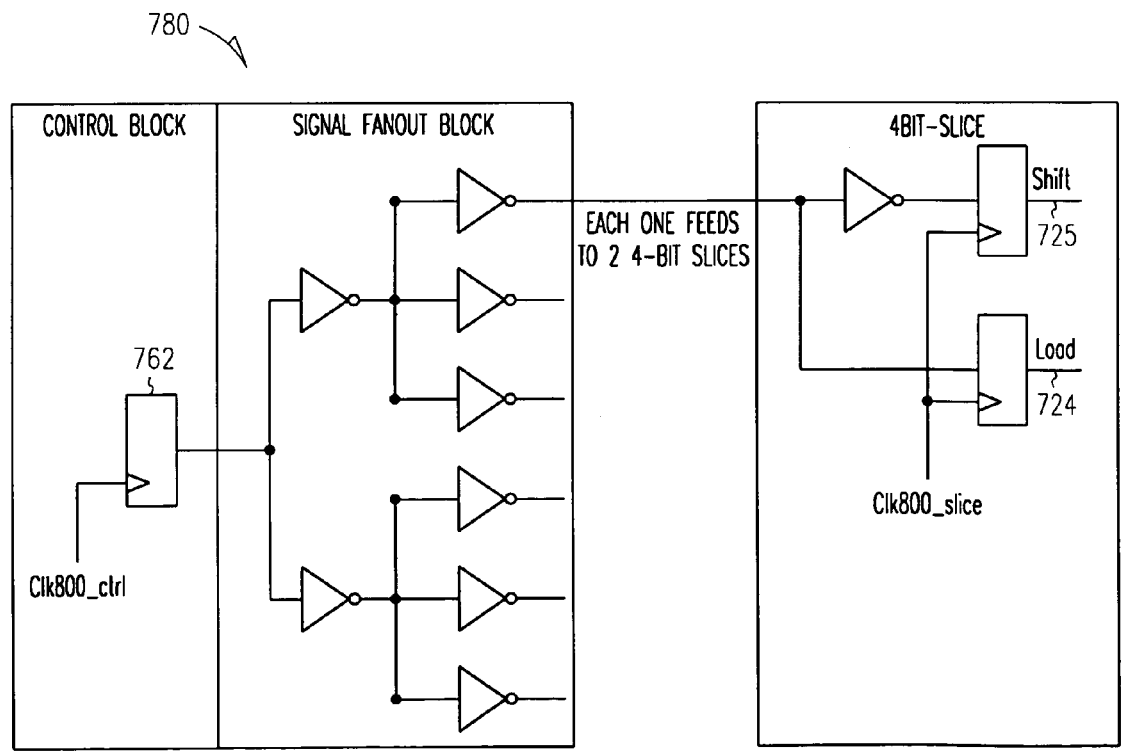
FIG. 7D is a diagram showing the fanout structure of FIG. 7.

FIG. 7C shows a PFSSD control block 760, shown in FIG. 7. FIG. 7D shows a Signal Fanout structure 780, shown in FIG. 7, being utilized by the control block 760. The control block 760 is basically a synchronous ring oscillator. The sync signal 707, which originates from the LLP, passes through an L2 type latch 767 clocked by a 200 Mhz core clock, Coreckl 761. The signal then feeds through several metastable flops 763 before feeding into the ring oscillator 764 as shown. The control block uses the rising edge of the sync signal 707 to generate a signal, Ldctl 762, which is four 800 Mhz clocks wide and is high on one of the 800 Mhz clocks. Ldctl 762 is then forwarded to each 4 bit slice where each generates its own Load 724 and Shift 725 signal, as shown in FIG. 7D.

Figure 7E:
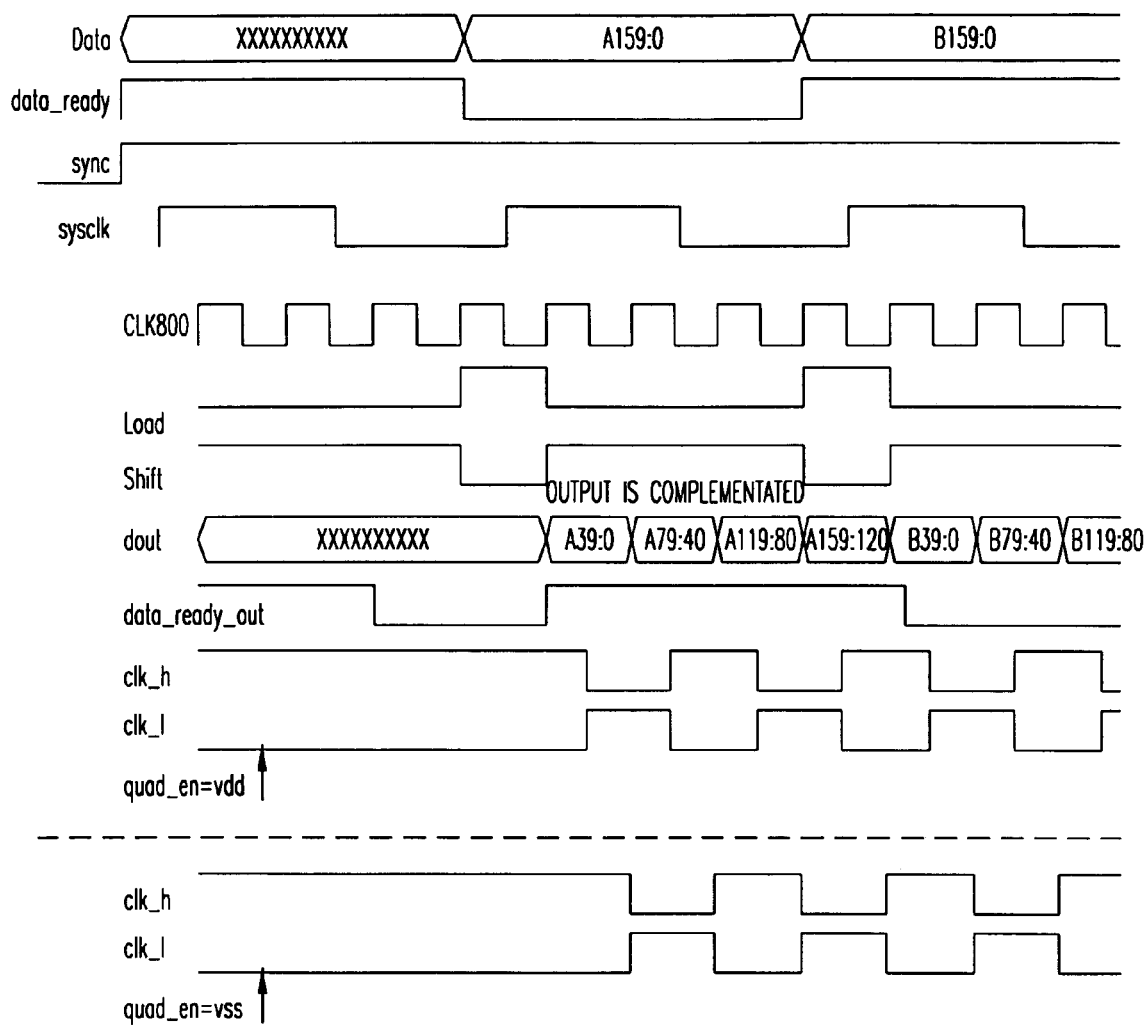
FIG. 7E is a timing diagram showing the timing of a PFSSD 4×1 multiplexer.

FIG. 7E shows the timing essentials of the PFSSD.

Some additional suggestions for PFSSD enablement now follow. The PFSSD should be bit stacked as a hard macro instead of placed randomly. The control block should be placed in the middle, and all 48 single bit slices (12 4-bit slices) should be placed symmetrically along each side. All input ports should be placed in one edge of the PFSSD hard macro, and all output ports should be distributed evenly along the center. The 800 Mhz clock fanout tree should be placed carefully to reduce the clock skew at each output flop. If possible, isolated wire should be used for routing the clock fanout tree. Same attention should be paid to the placement of buffers for fanning out the load signal from the control block to each bit slice. The placement areas should be highly utilized but should not conflict with routability. Because outputs from the PFSSD are complemented, it is critical to have the inverted clock standard cell placed between the PFSSD and all corresponding IO cells to rebuffer the signals. The high speed clock driving the control block must be the earliest clock in the PFSSD. This block produces a control signal which is fanned out to all the bit slices. The fanout has inverters and long routing metal that must make the flop to flop timing within the 800 Mhz clock cycle. The optimum timing would have the clock reaching the control block 50 to 100 ps earlier than the clocks to the rest of the PFSSD, but no more than 250 ps earlier. The edge rate of high speed clocks anywhere inside the PFSSD must be 200 ps (10%-90%). The edge rate of core clocks inside the PFSSD should be no more than 300 ps (10%-90%). The edge rate data signal, including Load 724 and Shift 725 signals, anywhere inside the PFSSD should be no more than 300 ps (10%-90%). The edge rate of test signals must be within 4 ns (10%-90%). And finally, the high speed clock skew at the output flops 763 of all 48 4×1 time multiplexers must be ±25 ps from the flop that launches clk_h 708.

PFSSR

Figure 8:
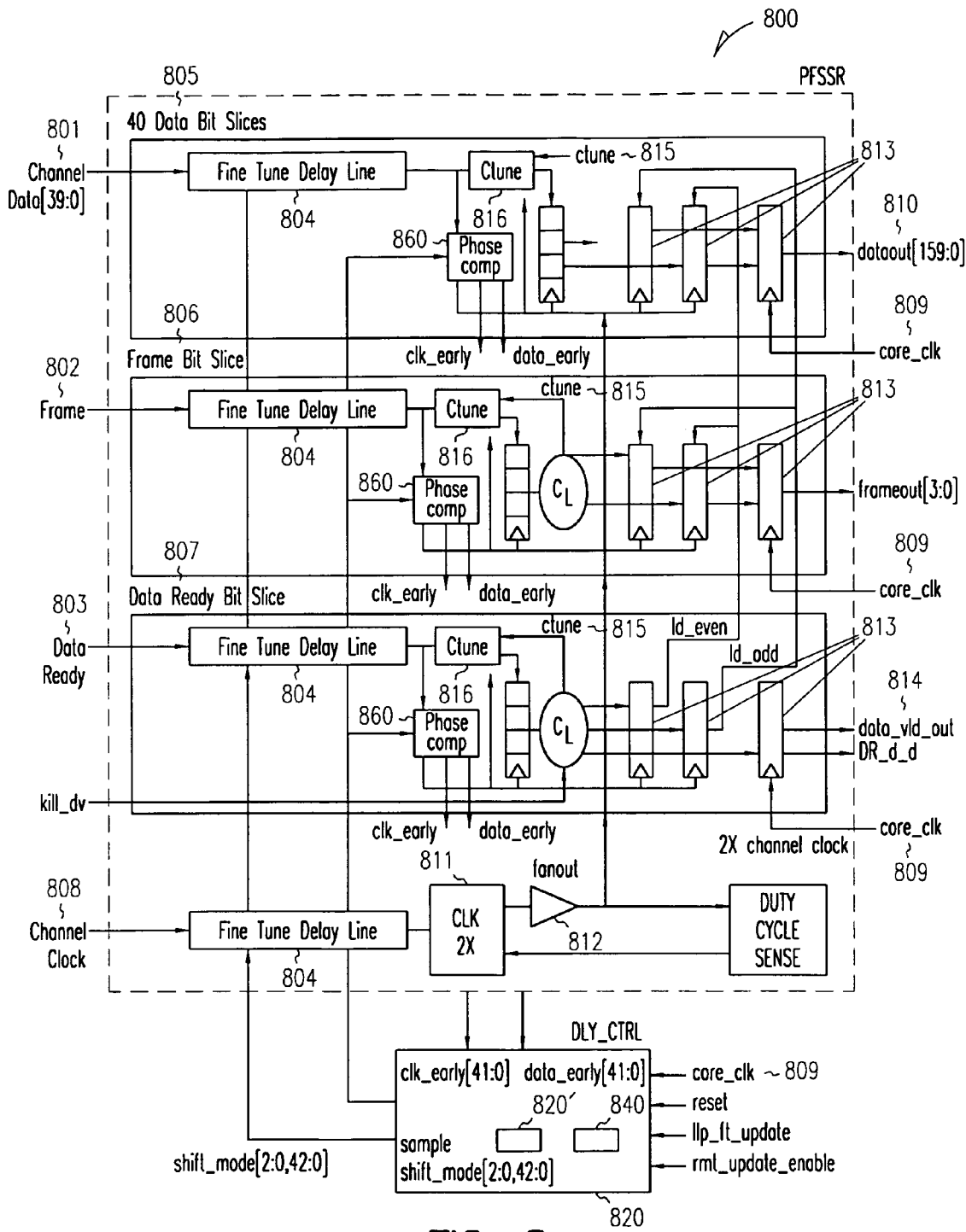
FIG. 8 is a block diagram showing a PathForward Source Synchronous Receiver (PFSSR) and external delay line controller.

FIG. 8 shows a conceptual block diagram of a PFSSR 800 and its associated Delay Line Controller 820. The PFSSR 800 comprises inputs Channel Data[39:0] 801, Frame 802, and Data_Ready 803, Channel Clock 808 and core_clk 809. The PFSSR 800 further comprises data bit slices 805, Frame bit slice 806, and Data_Ready bit slice 807. The bit slices comprises deskew circuitry comprising a phase comparators 860, fine tune delay lines 804, coarse tune delay lines 815, and high speed flops 813. Furthermore, the PFSSR 800 comprises a frequency doubler, CLK 2X 811, and a fanout 812. The Delay Line Controller 820 comprises a digital filter 840, and a state machine 820'. The controller 820 maintains minimum latency through the delay lines 815 and 804 to minimize any added jitter added by the delay line itself, and does so by monitoring and filtering phase comparator 860 responses. Phase measurements are taken inside each bit slice 805, 806, and 807 with a sequential phase comparator 860. The external delay line controller 820 filters the phase comparator 860 responses by use of a filter 840, and uses the information to regularly update the fine tune delay lines 804. Coarse tune delay lines 815 are set once upon completion of an initial start-up sequence to realign bits which have phase slip which exceeds one bit width. The PFSSR 800 utilizes circuitry to adaptively deskew delays between all data bits Channel Data[39:0] 801, Data_Ready 803 and Frame 802, and to optimally position the capture clock between opening and closing edges of the "data eye." The deskew circuitry continuously monitors phase comparators 860 inside all data bit slices and periodically adjusts the tap settings of the data and clock Fine Tune Delay Lines 804 to optimally position the sampling clock. The PFSSR 800 performs 4 to 1 demultiplexing on received data by use of the bit slices 805, 806 and 807.

The PFSSR 800 performs 4 to 1 time demultiplexing on input data signals at 800 Mb/s to output four data signals at 200 Mb/s. It receives a pair of complementary clocks, Channel Clock 808 and core_clk 809. It also uses two handshake signals, Data_Ready 803 and Frame 802 to synchronize the Channel Data 801 to a core channel frequency. The PFSSR 800 receives 40 data bits 801 (plus Data_Ready 803, and Frame 802) of serialized, high speed data and performs 4 to 1 time de-multiplexing to provide 160 bits of output data, dataout[159:0] 810, to the core. The Channel Clock 808 is received differentially, frequency doubled (CLK 2X 811), and fanned out (fanout 812) to high speed flip flop elements 813. The Channel Data 801 is received by a high speed 4 bit shift register (not shown). The outputs from the shift register are loaded into either one of two banks of 4 bit registers (known as the EVEN and ODD registers). The first set of four bits out of the shift register are loaded into the EVEN register and the following set of four bits are loaded into the ODD register. Data_vld_out 814 is generated from the handshake signal Data_Ready 803 and is a plesiochronous signal received by the core. When received by the core it indicates that the first piece of data is valid in the EVEN register. The data in the EVEN register can then be sampled by the core clock and on the following cycle of the core clock, the ODD register can be sampled. Internal to the PFSSR 800, the Frame 802 signal is treated equivalent to Channel Data 801, with the exception of the CTUNE sequence 816. Frame 802 is used by the LLP for data frame alignment when DC-free data encoding is utilized.

The channel interface from the PFSSR 800 to the LLP 110, 210, 310 is treated as plesiochronous. That is, the source synchronous channel clock and the receive side core clock are referenced to separate oscillators which may be mismatched in frequency by no more than several hundred of PPM. Whenever there is a slower receive side clock there is an undersampling condition which can lead to eventual bit error. Undersampling causes the data "eye" to be sampled later with each new clock cycle. Under sampling is resolved by limiting the maximum length of consecutive data bits before resetting Data_Ready 803. There is a trade-off between hold time margin and the maximum burst length. The synchronization occurs through the use of a two stage synchronizer (not shown). The synchronizer is implemented with common standard cell latches (not shown). There is approximately several hundred nanoseconds of 'start-up' or 'lock' time that must be accounted for (i.e. tolerated) in the interface between LLP/PFSSD and PFSSR/LLP, due to the analog nature of the frequency doubler 811 and delay lines 804 and 815 used in the PFSSR 800. The delay lines 804 and 815 have a significant (RC) time constant to minimize jitter due to rapidly changing conditions. Under normal start-up conditions the frequency doubler 811 has approximately several (clk2x) clocks of latency between an incoming channel clock and a fanned out (clk2x) clock.

Figure 8A:
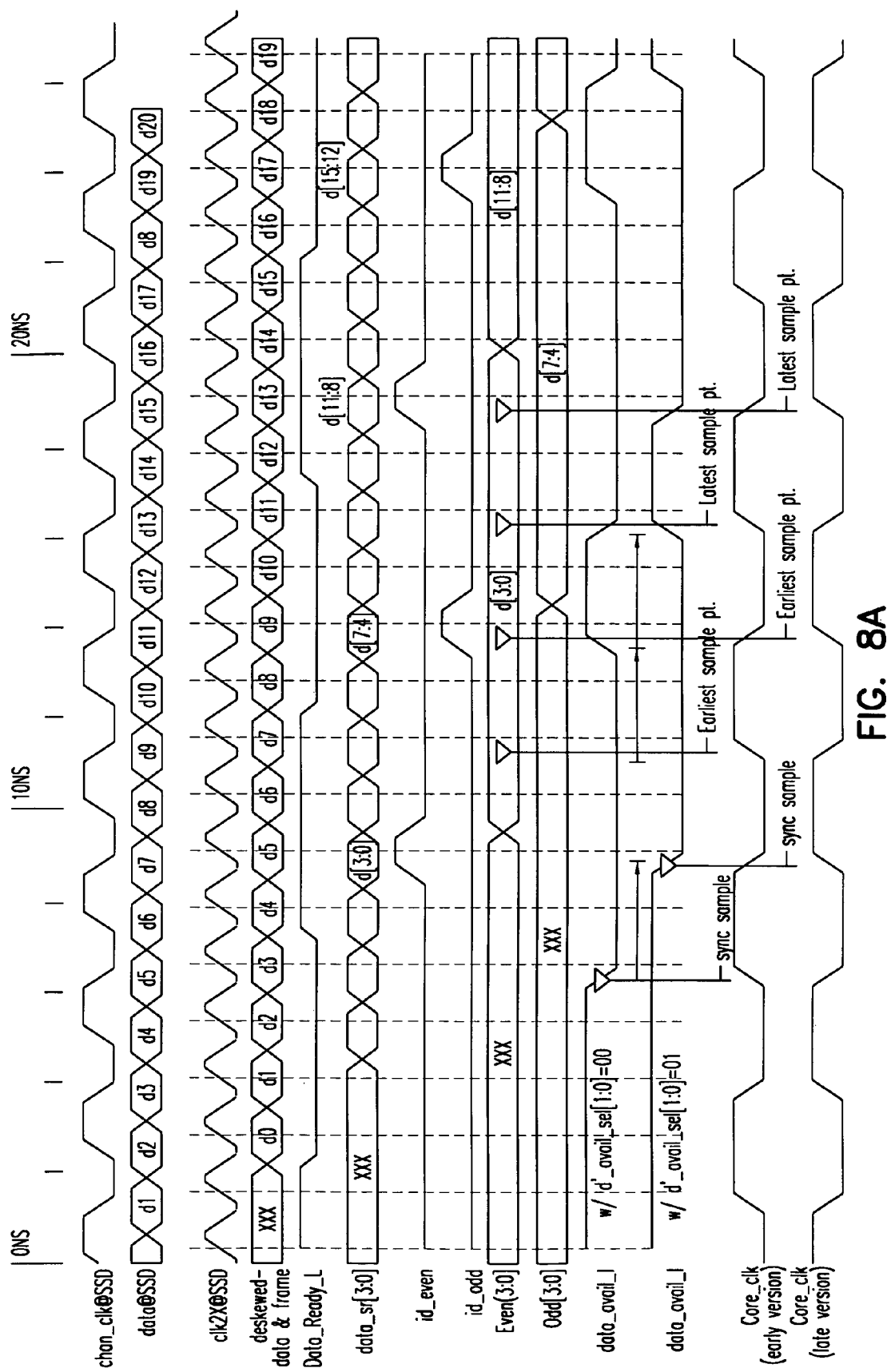
FIG. 8A is a PFSSR timing diagram.

FIG. 8A shows the timing relationships between Channel Data 801, Data_Ready 803, Frame 802 and Channel Clock 808 at the transmit chip and at the receive chip. The top two signals are from the transmit side while the rest of the signals are at the receive side. In the figure, data 801, Frame 802 and Data_Ready 803 signals are shown after being deskewed by the deskew circuitry. When data is sent across the channel, the shift register is serially loaded and then alternately transferred to the Even and Odd registers. The 1d_even and 1d_odd signals are derived from the Data_Ready_1 signal. The Even and Odd registers hold data for 8 consecutive Clk2X cycles to allow plesiochronous transfer from the channel clock domain to the Core clock domain. The transfer of data from the Channel clock domain to the Core clock domain is plesiochronous (i.e. asynchronous where the frequency of the launching and capture clocks are matched to within ~±100 PPM). The data transfer is accomplished using the Data_Ready 803 signal, which acts as a reference for aligning micropackets at the PFSSR 800. When no data (micropackets) are sent across the channel, Data_Ready 803 signal is inactive (high). As micropackets start across the channel, Data_Ready 803 immediately alternates between low for 4 channel bits and high for 4 channel bits. Inside the Data_Ready bit slice 807, Data_avail_1 is derived from Data_Ready 803, which is used to indicate whether data should be transferred from the Even or Odd registers inside the Data bit slices 805 and Frame bit slice 806 to the Core clock flops. Data_avail_1 is successively low for 6 bits then high for 2 bits when active data is sent across the channel. Data_avail_1 is then sampled by a 2 stage synchronizer in the Core clock domain. When the synchronizer samples a logic zero, it indicates (via Data_valid_out) that data can be safely transferred from the Even and Odd registers to the Core clock flops. Data can be transferred from the Even/Odd registers anytime during a one Core clock cycle window depending on the relative phase relationship between the Channel and Core Clocks. Consider the situation where micropackets just begin to go across the channel after a period of no valid micropackets. The synchronizer samples the Even register between the earliest and latest points. Since the Channel and Core clocks are not perfectly frequency matched there is relative phase accumulation that takes place from one cycle to the next. This means that the next time that the Even register is sampled it may be sampled somewhat earlier/later if the Core clock frequency is higher/lower. Hence, there are two interesting clocking cases to consider: a faster receiving clock (over sampling) and a slower receiving clock (undersampling). In the oversampling case, data_avail_1 will be sampled earlier and earlier as time proceeds and eventually the zero (active low) value will not be sampled. Not seeing a data_valid_1, the LLP will skip one Core clock cycle waiting for valid data out of the PFSSR. One clock cycle later data_avail_1 will once again be low (assuming active data) and data can again be read from the Core flops. Hence, within a bounded limit of clock frequency matching, the oversampling condition is not problematic as it corrects itself by skipping one clock cycle until new valid data appears. In the undersampling case, data_avail_1 will be sampled later and later as time proceeds until eventually data_avail_1 will be sampled too late to capture the active low value (violate Hold time requirement of the Core clock flop). This will lead to missed data transfer and channel failure. The way around this is to limit the burst length of data such that the accumulated phase drift never exceeds the synchronizer's hold margin at the time of the first data transfer.

Bit Deskew and Clock centering circuitry is added to independently center the capture clock within the center of each data eye. The deskew is achieved by adding additional delay to "early" arriving data signals so they match the "latest" arriving signal. Additional delay may be added to the clock or data signals to position the clock within the data eye. The Delay Line Controller 820 maintains minimum latency through the delay lines once the objective has been met. The delay lines are composed of Fine 804 and Coarse 816 tune stages. The Fine tune stage provides a minimum of 1.5 ns of fine tune deskew range with less than 90 ps step sizes. The Fine tune delay lines are made from differential delay circuits which further offer differential duty cycle correction. An internal muxing scheme eases many timing and physical design concerns encountered when selecting between tap points distributed along a long delay line. The Coarse tune stage provides a frequency dependent amount of additional delay (1, 2 or 3 clock cycles) which corresponds to a range of 2.5 ns at signaling rates of 800 Mb/s. The Coarse tuning technique uses the Frame 802 signal as a references and can deskew ±1 clock cycle of delay variation with respect to this signal. Two unique Frame signals 802 are used in bi-directional signaling over a single cable (traveling in opposite directions). The forwarded channel clock is nominally delayed from the Channel Data 801 by 90 degrees (¼ channel clock period). This takes place on the transmit side of the link by either launching channel clock off of the opposite edge of the high speed transmit clock as the Channel Data 801 (Default) or by launching clock and data off of the same core clock edge and then delaying the clock with an additional PCB foil trace length. A digital Sample and Hold Phase Comparator (not shown) is used to establish the phase relationship between the local capture clock and the Fine tuned deskewed data. Since any individual phase comparison would be subject to significant error due to data edge jitter, a minimum of 256 samples (nominal filter size) are required before a new estimate of "data early" or "clock early" can be made. The individual phase comparisons are digitally filtered inside the Delay Line Controller 820 prior to any adjustments being made to the delay line tap settings. An initial training sequence is required to deskew and center the data and clock. The channel protocol (LLP) will incorporate an initial start-up sequence which provides a sufficiently long sequence of data edges to guarantee that the Delay Line Controller 820 can deskew the data using the Fine Tune Delay Line 804. At the end of this start-up sequence a one-time coarse tune sequence is initiated. The coarse tune sequence is required because the phase comparator 860 has phase ambiguity if the clock is skewed from the data by more than ±Tbit/2. In other words the phase comparator 860 cannot distinguish whether the Nth clock edge is being compared against the Nth or (N+1)th or (N−1)th data "eye". Therefore the one time coarse tuning sequence is used to re-align all data bits which have slipped beyond the resolution of the phase comparator 860. Logic inside the Frame data bit slice 806 is designed to detect a Coarse tuning sequence ('110011') which is sent on the incoming Frame 802 signal. Upon detection, a pulse (known as CTUNE) is generated and fanned out to all the data bit slices, Data_Ready bit slice 807, and Frame bit slice 805. The CTUNE pulse delays the incoming data either 1, 2, or 3 clk2x (i.e. frequency doubled version of channel clock) cycles prior to entering the internal high speed shift register, after determining if the data is early, nominal, or late. If none of the slices have late arriving data, as determined via the logical OR of all the data, Data_Ready 803, and Frame 802 'late' signals, then all the data travels through one less coarse tune flip flop of delay to reduce the overall latency by one clk2x clock cycle.

Figure 8B:
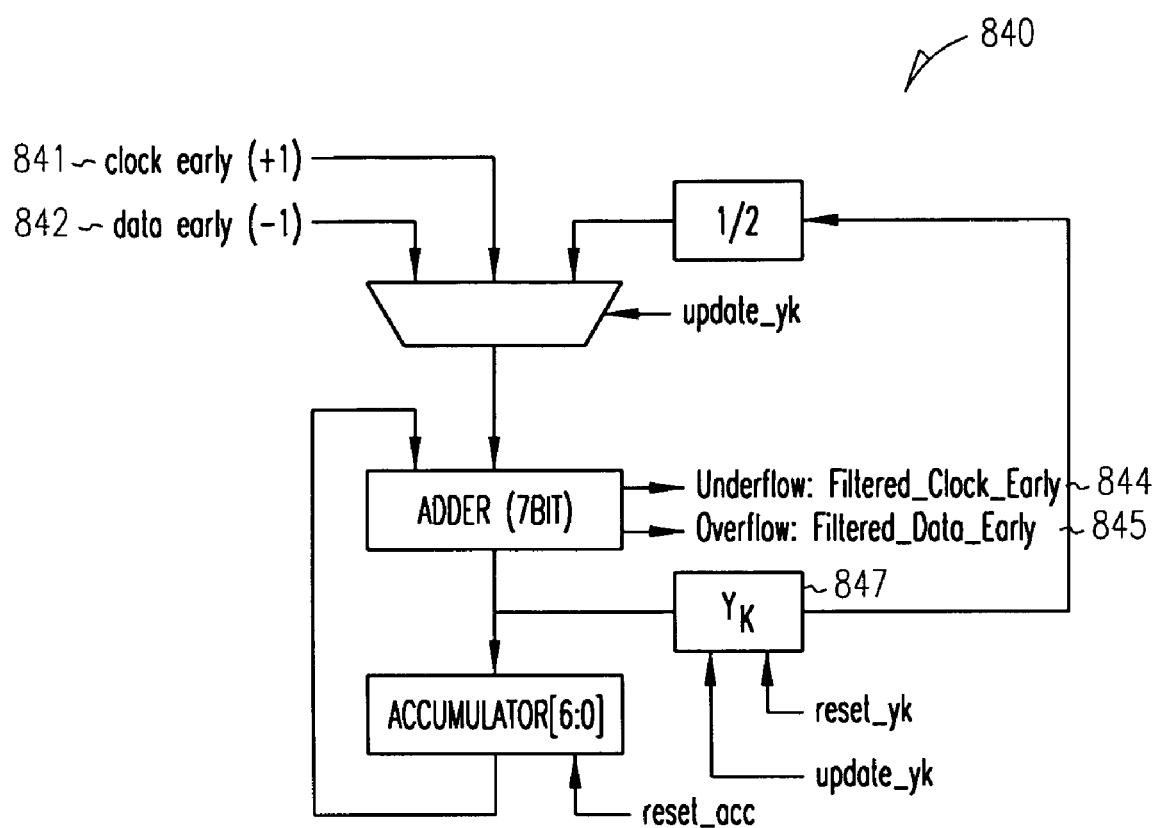
FIG. 8B is a digital filter associated with each PFSSR bit slice.

FIG. 8B is a block diagram of the digital filter 840, shown in FIG. 8. Since any given phase comparison is subject to data edge jitter (i.e. noise which may exceed ±200 ps), many samples are observed before an estimate of the relative clock—data relationship is made. A digital filter should be associated with each data bit to compute an estimate of the data-clk phase relationship (the filter computes a running accumulation (with fading memory) of the individual (clock_early 841, data_early 842) comparisons.) The filter implements the recursive relationship: Y k=ACC k+1/2*Y $_{k-1}$, where ACC k is the accumulated sum of the last ~128 samples. The filtered outputs (Filtered_Clock_Early 844, Filtered_Data_Early 845) go active only if Y$_k$ 847 overflows or underflows which would require a minimum of ~256 samples (nominal filter size) from when Y$_0$=0. The benefit of the digital filter 840 is that the noise is being sampled a minimum of 256 times before a new filtered phase estimate is made. The standard deviation of the average of N=256 samples of a random variable is 1/sqrt(N=256)=1/16 times as large as that of a single sample. Consequently the expected error based on N measurements is 1/sqrt(N) times as large as the error based on a single measurement Another benefit of this filter is that if there are not a sufficient number of data transitions the filter will not allow the delay line to change state. The Fine Tune delay line can update in as short of time as Tclk*1024=5 ns*1024=5.12 us. An individual update can cause the data delay to move relative to the clock delay by 1 or 2 tap setting (45 ps/90 ps increments BC/WC). In order to deskew 1250 ps of skew one tap setting at a time (BC) will require 150 uS assuming sufficient data transitions. This should be quite sufficient for tracking delay variations due to voltage/temperature variations.

Figure 8C:
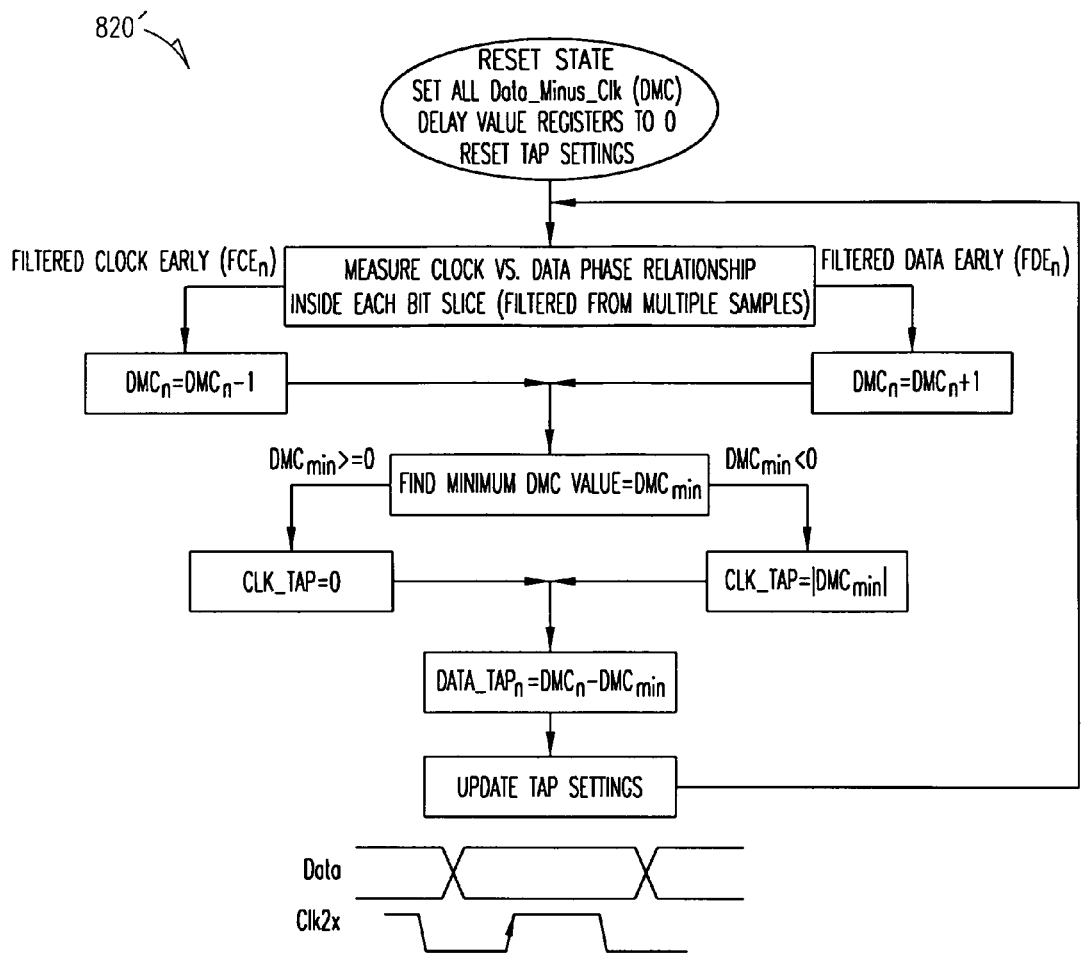
FIG. 8C is a flow chart of a state machine utilized by the delay line controller of FIG. 8.

FIG. 8C shows a sequencer state machine 820'. The sequencer state machine 820' is the heart of the delay controller 820, shown in FIG. 8. The state machine generates control signals which among other things sample phase comparisons, update DMC values, capture minimum DMC values, control filter modes and update tap settings. The sequencer determines whether delay line updates will occur under control of the state machine or remotely from the LLP. The state machine may be reset synchronously by either assertion of the sys_reset or jtag_reset. Once reset the state machine samp_cnt increments on successive core clock cycles. The samp_cnt continues until overflowing the terminal count (see exception for rmt_update_enable below). The terminal count value is controlled by fcntlen[1:0] where termcnt[9:0]=10'd515 {00}, 10'd259 {01}, 10'd131 {10}, 10'd67 {11} fcntlen is controlled from a JTAG data register and upon JTAG reset fcntlen is to be reset to 2'b00. Phase comparators will sample and latch the first comparison after samp_cnt[1:0]!=2'b00. The latched comparison is cleared when samp_cnt[1:0]=2'b00. Strobe is used to capture the comparator's latched value at the end of each sample window and to increment or decrement the accumulated phase comparison sum ACC$_k$ (CE=+1, DE=−1). The filter Y$_k$=ACC$_k$+0.5*Y$_{k-1}$ value is updated when samp_cnt=termcnt−9. At this time, the minimum DMC calculation begins (dmin_cptr). The DMC (Data Minus Clock) register is updated (update_dmc) when samp_cnt=termcnt−8. Once the minimum DMC value is computed the delay lines may be updated. The Fine Tune control bits ft_mode[2:0] along with the ft_clk are asserted when the controller either gets a rmt_ft_update from the LLP (if rmt_update_enable) or when samp_cnt=termcnt (if !rmt_update_enable). If updates are controlled from LLP (rmt_update_enable), the samp_cnt will continue to increment until the rmt_ft_update arrives at which time samp_cnt and ACC$_k$ are reset.

Figure 8D:
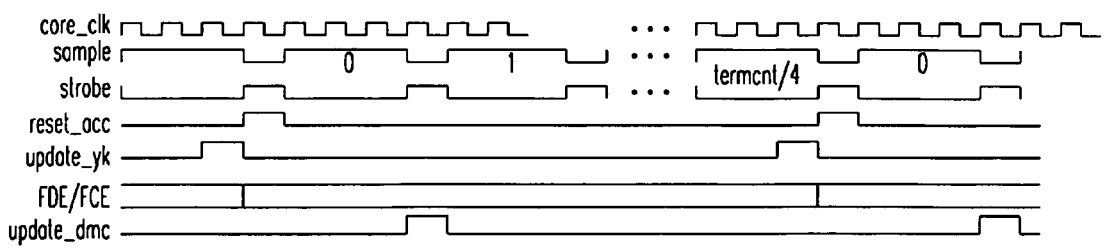
FIG. 8D is another PFSSR timing diagram.

FIG. 8D is a timing diagram of the signals which control the Delay Line and Controller.

Figure 8E:
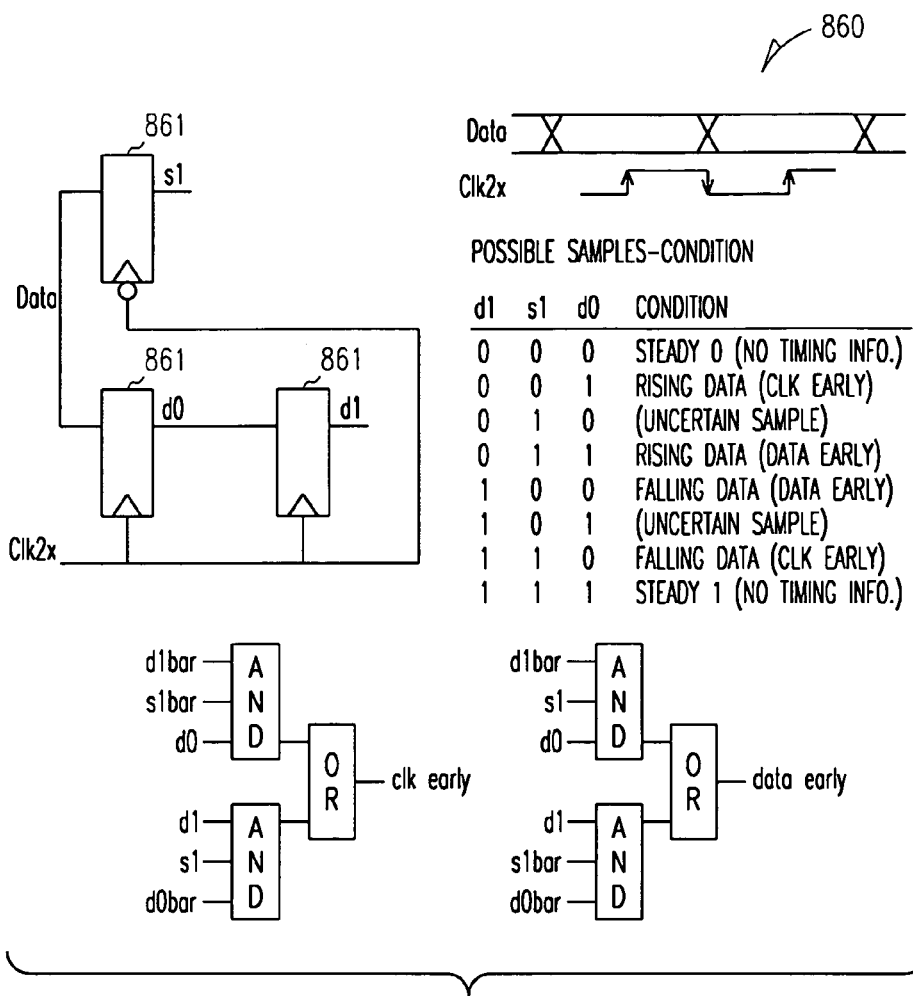
FIG. 8E is a bit slice phase comparator of FIG. 8.

FIG. 8E is a simplified diagram of the phase comparator 860, shown in FIG. 8. The phase comparator 860 inside each bit slice 805, 806, and 807 produces an output which indicates whether a sampling clock is early or late with respect an optimal clock position. The phase comparator requires a 50% duty cycle clock with 2 edges per data bit so a clock frequency doubler with duty cycle control is utilized to double the incoming channel clock frequency. The phase comparator's flip flops 861 match those of the data capture flip flops 813 so the phase comparator 860 can properly position the clock in the data eye independent of the setup and hold requirements of the capture flip flops 813. The complete phase comparator 860 has logic to hold the first phase comparison that occurs after the sample input signal goes active. Each sampling window is 16 data bits wide so consecutive comparisons should not be subject to cycle to next cycle correlations. This phase comparator is subject to ambiguity in its measurements. Ideally the Nth posedge (Clk) is to be delayed approximately Tbit/2 from the Nth Data edge. However, if Clk was offset by an integer number of clock cycles the phase comparator wouldn't distinguish the cycle slip. If there was any cycle slip across all of the data bits the captured data could not be properly assembled without someway of accounting for the cycle slip. Such cycle slip is taken care of with a coarse tune delay line which follows the fine tune delay line. This circuitry can deskew all data bits as long as there is not more than one clock cycle slip either direction of any individual data bit or Data_Ready relative to the Frame bit (Frame 802 acts as a coarse tune reference bit). This range could easily be increased to an arbitrary limit with additional circuitry. The coarse tune circuitry adds either one more or one less cycle of latency relative the Frame bit to realign the bits. Coarse deskew is accomplished during a one-time event at the end of the initial deskew process.

Figure 8F:
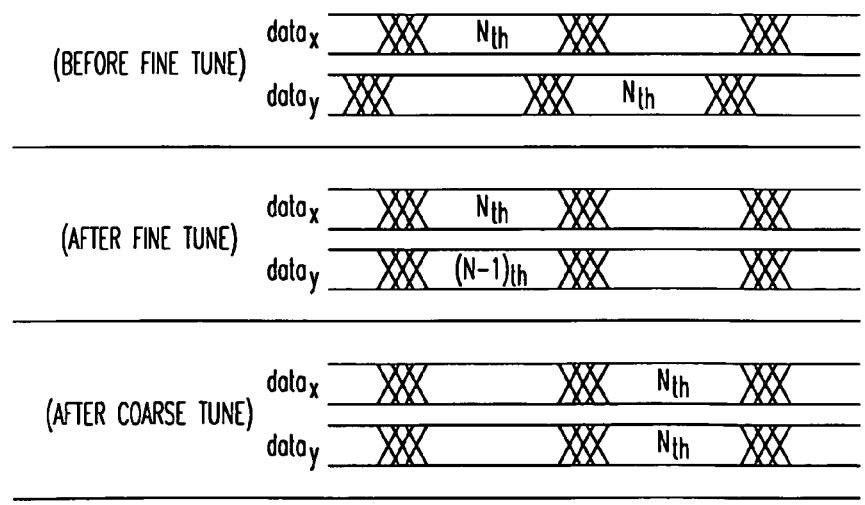
FIG. 8F is a diagram showing bit alignment after coarse and fine tune deskewing.

FIG. 8F shows the results of bit alignment.

Some additional suggestions for PFSSR enablement now follow. The inverted copy of data at the fine tune delay line input is to be generated locally. The edge rate of the channel clock and the high speed clock (i.e. CLK2X) anywhere inside PFSSR must be no more than 200 ps (10%-90%). The Data and Channel Clock path must be balanced from IO cell to the first capture PFSSR flip flop across all Process, supply Voltage, and junction Temperature (PVT) conditions. This path will include the minimum delay path through the fine tune delay line and the rising edge delay through the clock doubler circuitry. This is especially important for compatibility with other communication channels where bit deskew and clock centering is not active. The edge rate of any data signal, including load signals anywhere inside PFSSR should be no more than 400 ps (10%-90%). The edge rate of all test signals must be no more than 3 ns (10%-90%). The differential input to the Fine tune delay line is to be generated by inverting a single ended input. This inversion should take place local to the delay line input with minimal latency and balanced rise/fall delay. All Clk2X paths should be timed at 1.6 GHz (Nominal PVT) and 1.2 GHz (WC PVT).

Signaling

Figure 9:
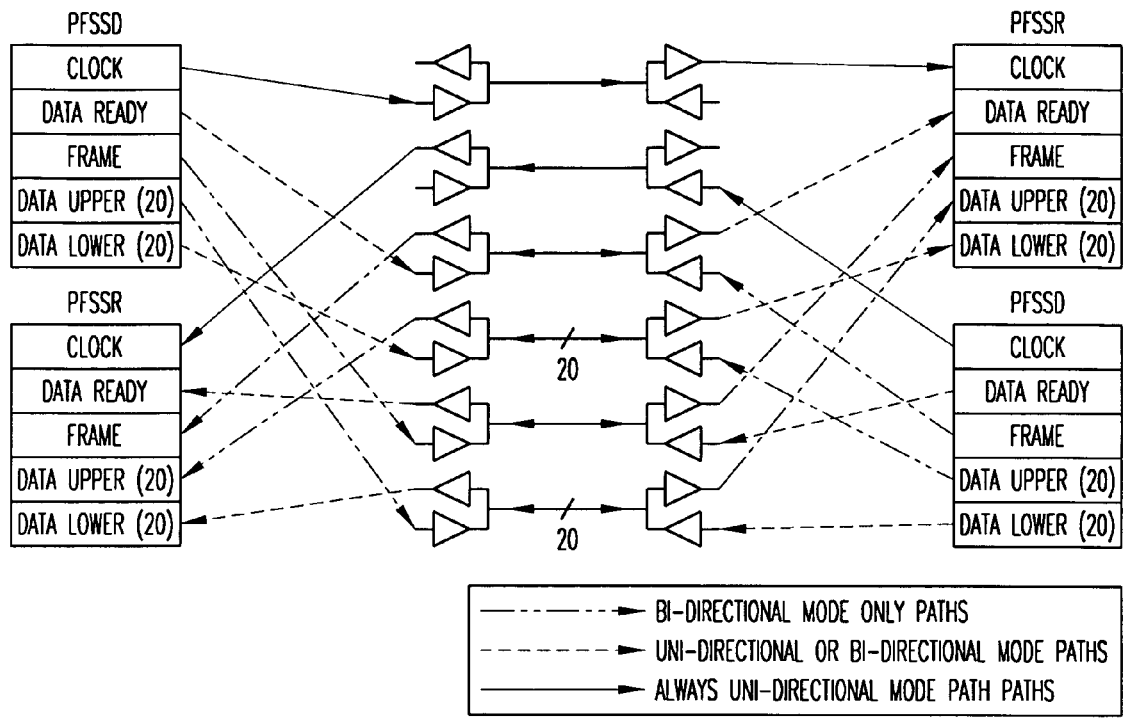
FIG. 9 is a diagram showing bidirectional and unidirectional communication between PFSSDs and PFSSRs.

The present invention can signal in either unidirectional or simultaneous bi-directional modes. FIG. 9 illustrates the signal paths of the communications medium 400, shown in FIG. 4, if both transceivers 410 and 420 are communicating in simultaneous bi-directional mode, and wherein the receivers and drivers are Path Forward Source Synchronous as described above. The signals include 40 Data bits (20 Upper and 20 Lower), 1 Data_Ready bit for micropacket alignment, 1 Frame 802 signal used for 8/9b DC free signal encoding/alignment plus 1 channel Clock. The Frame 802 signal appears to the PFSSD/PFSSR as an additional bit.

Figure 10:
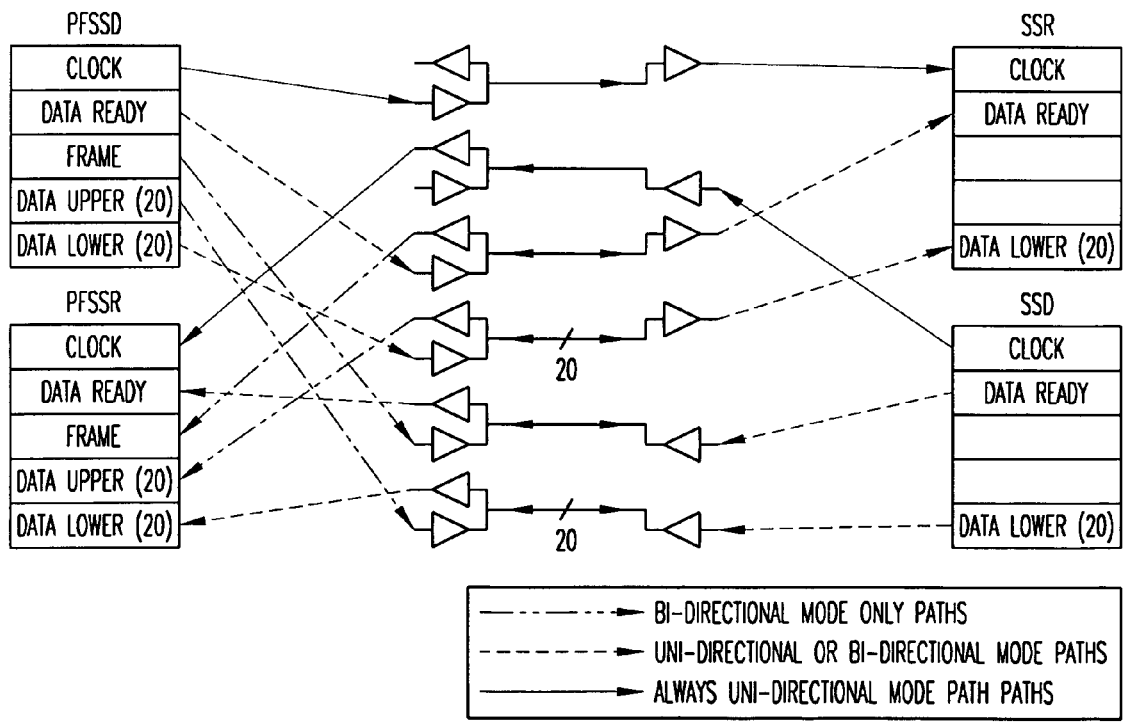
FIG. 10 is a diagram showing unidirectional communication between PFSSD/Rs and Source Synchronous drivers and receivers (SSD/Rs)

FIG. 10 illustrates the signal paths of the embodiment described in FIG. 5, where transceiver 510 has PathFoward Source Synchronization capabilities, and transceiver 520 does not (e.g. the drivers and receivers of that transceiver are only Source Synchronous (SSD/SSR)).

The present invention can be implemented utilizing both single-ended and differential signaling. The sections below entitled "Single-Ended Signaling" and "Differential Signaling" describe these types of signaling.

Single-Ended Signaling

The single-ended signaling format is binary NRZ (BNRZ), with a low voltage level corresponding to a 0, and a high voltage level corresponding to a 1. Data transmitters are capable of producing an unloaded voltage swing from ground to V dd. However, since both source and destination termination are utilized, the observed voltage swing has nominal values of $V_{dd}/4$ and $3V_{dd}/4$ for a single transmitter operating into a quiescent termination to mid-rail ($V_{dd}/2$). For bi-directional signaling, the observed channel signal assumes nominal values of 0 V (Left and Right transmitters both 0), $V_{dd}/2$ (Left and Right opposite values), and $V_{dd}$ (Left and Right both 1). Proper termination, nominally matched to the transmission line, is provided at both ends of the channel by connection to communications medium transmitters discussed below. In order to remove variations due to process characteristics, voltage, and temperature, automatic setting of termination resistance is provided in the transmitters. This setting is updated periodically to provide tracking of variations. At the present time, single-ended channels are intended primarily for communications between chips on a single printed circuit board. Specifications for single-ended channels are met for an inter-chip distance of up to ten inches, with both chips mounted on the same printed circuit board. Single-ended communications over longer distances is a future possibility. Unidirectional communications at a nominal rate of up to 800 megabits per second (Mb/s) are supported. Bi-directional communications at a nominal rate of up to 800 Mb/s in each direction, for a composite rate of up to 1600 Mb/s, are supported. The bit-error rate (BER) for each channel, independently of mode of operation, data pattern, and data rate (up to the maximum supported), does not exceed $10^{-7}$.

The transmitter utilized in single-ended signaling is a non-inverting three-state CMOS output with digitally controlled AC and DC characteristics. Output levels are either 50-60 ohms to Vdd, 50-60 ohms to Vss, or high impedance. Control is provided to compensate for variations in wafer Process, supply Voltage, and junction Temperature (PVT). Without adjustments, characteristics could vary over a 2:1 range. Output impedance is adjusted with digital controls PVT[30:1]. Of these signals, 15 are used to turn on extra parallel PMOS pullups and the other 15 are used to turn on extra parallel NMOS pulldowns. To improve the linearity of the output impedance to a 5% tolerance, diffused resistors are used in series with the PMOS and NMOS elements. Predriver strengths are adjusted by using the PVT controls, stabilizing output slew rates and power supply current transients.

Figure 11:
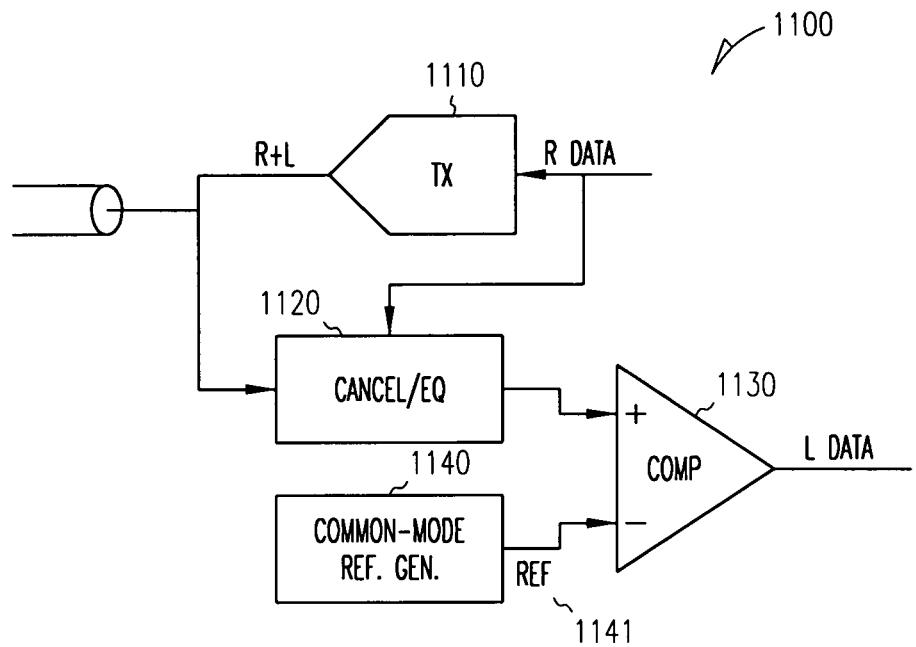
FIG. 11 is a diagram showing a single-ended signaling receiver.

FIG. 11 shows a schematic of a simplified single-ended receiver 1100. A "right-hand" receiver is shown. The receiver consists of a terminator 1110, a canceller/equalizer 1120, a comparator 1130, and a common mode reference generator 1140. In one embodiment, the termination function is implemented by the transmitter discussed in the previous paragraph. Cancellation of the outgoing signal is accomplished in the canceller/equalizer 1120, leaving, ideally, only the incoming signal at the canceller/equalizer output. This signal is equalized and compared to a reference signal in the comparator 1130, which produces logic levels as input to the bit deskew delay line in the PFSSR. The signal R+L at the output of the transmitter is the sum of the incoming (left) signal and outgoing (right) signal. Since the outgoing data (R Data) is known to the canceller/equalizer 1120, it is capable of subtracting (after appropriate scaling and delay) the outgoing signal from the sum, leaving only the incoming left signal. This resultant signal is compared to a reference signal 1141, producing logic levels (L Data) suitable for the SSR. Resistive loading of the channel by the canceller/equalizer 1120 is no less than 1 KΩ. Capacitive loading is no greater than 0.1 pF. Noise induced by the canceller/equalizer onto a channel terminated at both ends does not exceed ±25 mV. The receiver accommodates a common-mode voltage offset of as much as ±250 mV. This voltage is defined as the difference in the ground potentials of the transmitter and receiver. The canceller/equalizer 1120 incorporates equalization circuitry to mitigate channel transmission line effects, including attenuation and bandlimiting. The equalizer consists of an amplifier following the canceling circuit, and driving a three-section highpass filter made up of three series capacitors and three shunt resistors. The voltages at the input and three interior nodes of the highpass filter are amplified and summed in FET amplifiers, forming a four-tap equalizer. Tap gains and resistor-capacitor values are optimized for a transmission line containing packages, two 10-inch printed circuit board traces, connectors, and three meters of cable. With single-ended signaling, a reference signal 1141 is required for use by the comparator 1130 in each receiver. Because the output of the canceller/equalizer 1120 swings above and below $V_{dd}/2$, the reference signal 1141 must nominally be equal to this value. However, tracking of common-mode noise is also required to reduce its effects.

Figure 12:
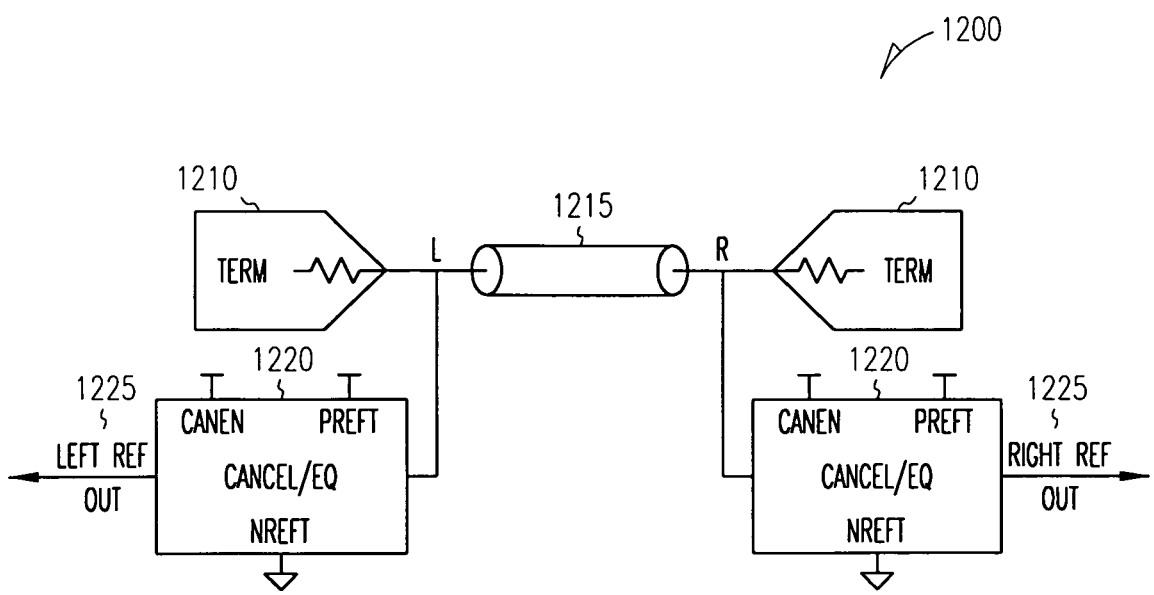
FIG. 12 is a diagram showing a single-ended signaling reference generator.

FIG. 12 shows a schematic of a simplified reference generator 1200. Both "right-hand" and "left-hand" generators are shown for clarity. Each generator consists of a terminator 1210 matched to the transmission line 1215 and a canceller/equalizer 1220. The transmission line 1215 is indistinguishable from the lines used for data: of the same type, connected the same as data lines, and physically located with data lines. Thus, the common-mode noise signals at points L and R in the figure should closely match the common-mode noise signals on the left and right data lines. The terminators have nominal output voltages of $V_{dd}/2$, and their output resistances are set in the same manner as the transmitters described above. Thus, their characteristics match those of the data transmitters, and track variations with process, voltage, and temperature. The canceller/equalizers 1220 are hard wired so as to disable an offsetting feature of the canceller/equalizer's 1220 (by connecting PREFT to $V_{dd}$ and NREFT to ground), and to enable its output drive capability (CANEN to $V_{dd}$). Thus, the canceller/equalizer's 1120 outputs track their individual inputs. This tracking may not be exact: the canceller/equalizer 1220 has a non-unity gain and may have an offset. However, the effects of the canceller/equalizers 1220 in the common-mode reference module matches those of the canceller/equalizers in the data paths. The distributed reference signal 1225 is not offset from the common-mode voltage out of the canceller/equalizer 1220 in any data path by more than ±20 mV in steady state. The 3-dB bandwidth of the reference generator is not less than 100 MHZ. The output resistance of the voltage buffer in the reference generator 1200 does not exceed 1 KΩ. One reference generator 1200 is provided for each data bus, with the reference voltage distributed to all receivers within the bus. The wire carrying the reference is isolated from parallel traces to reduce the coupling of noise onto the reference trace. This isolation consists of an empty area on either side of the reference trace. Specifically, the reference line is a 0.84 micron wire shielded on both sides by 0.28 micron wires, one connected to $V_{dd}$ and the other connected to $V_{ss}$. Separation between the reference wire and shield wires is 0.28 micron. Maximum length of the reference net is 10 mm, and maximum resistance of the net from end to end is 10,000 microns×0.09 ohms/micron=900 ohms.

Although the receiver module, depicted in FIG. 11, is intended primarily for bi-directional operation, operation in unidirectional mode is also supported. In particular, both the transmitter and canceller/equalizer provide means to be independently disabled. Whenever the transmitter is disabled, its output resistance is at least 10 KΩ. Whenever the canceller is disabled, the offsetting circuitry is non-functional, but the equalizer and amplifiers remain operational.

Figure 13:
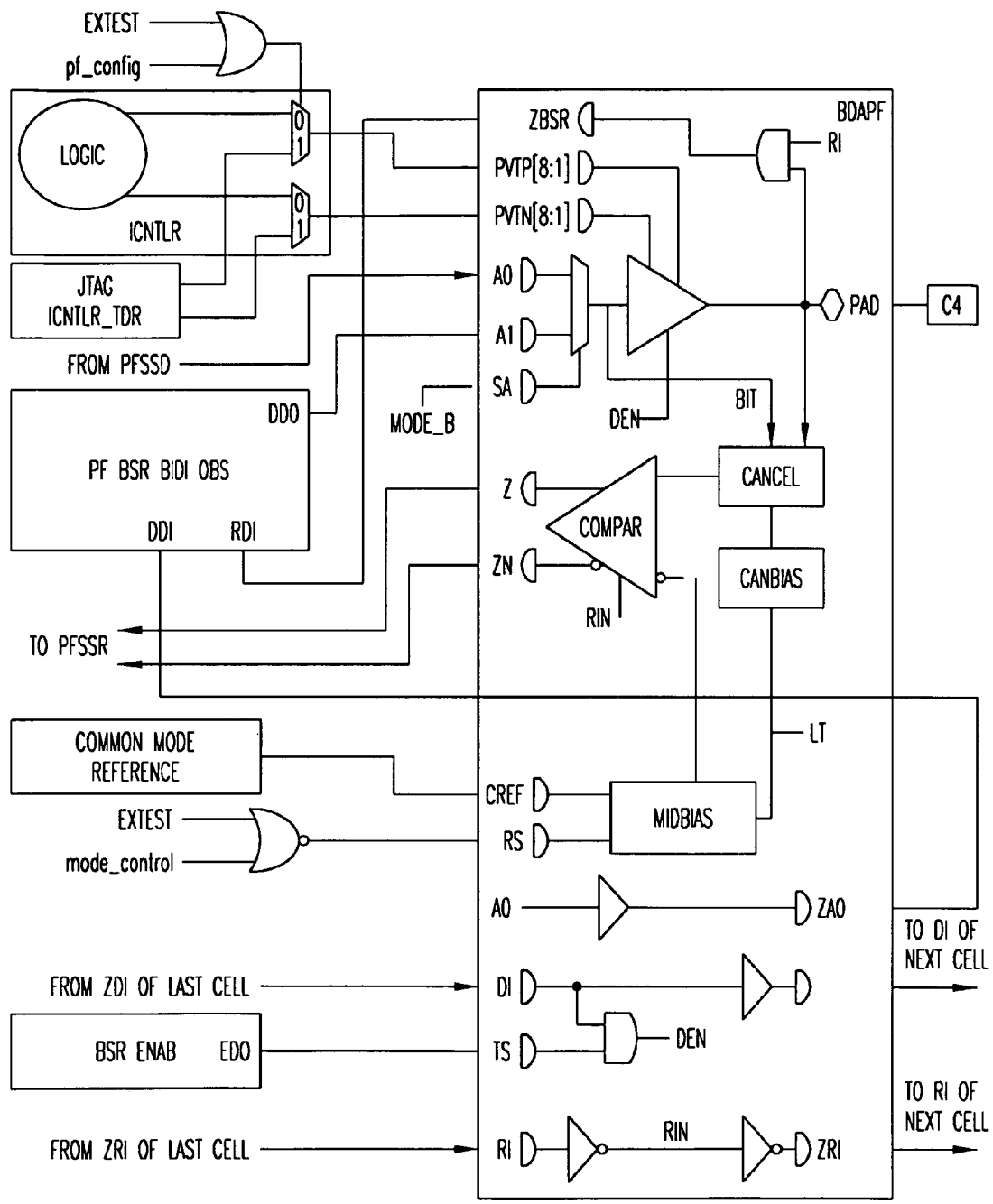
FIG. 13 is a block diagram showing a single-ended signaling driver/receiver I/O cell (BAPF) with input and output signals.

FIG. 13 shows a single-ended driver/receiver I/O cell, called a BAPF, and various signals utilized in testing. The connections to the BAPF I/O cell are described below. The receiver inhibit input (RI) gates all non-test receivers during test mode to prevent unknown states from entering network. Receiver output set to "0" when RI is "0". The driver inhibit input (DI) is used to tri-state drivers during test mode. The DI, RI signals are wired in a sequential daisy chain fashion around the die. The DI, RI inputs are driven from the ZDI, ZRI output of the previous I/O. The starting point of each chain comes from IBM specific receiver cells that are among the 64 test function pins. The pf_config bit is driven from a user defined test data register. These bits are configured when loading the appropriate TAP instruction and scanning in the intended bits. A 1 selects driver impedance from the icntlr test data register. This register is automatically set to a mid level after a JTAG reset. A 0 lets the ICNTLR function as intended as long as the EXTEST instruction is not loaded. The EXTEST signal is generated from the TAP instruction decoder. When the EXTEST instruction is loaded the EXTEST signal is 1, otherwise it's held at 0. The mode_control signal is derived from a primary input pin. This is held high during manufacturing testing. In the system this pin is tied to a 0. The Mode_B signal is generated from the TAP instruction decoder. This signal is used to configure the Boundary Scan Registers for the various boundary scan functions. The Mode_B signal is held 0 in system mode.

In system mode the output data comes from the pfssd through the A0 input of the TX2L driver to the pad. Mode_B is held at 0. The PVT impedance control bus is active and adjusts the output impedance of the TX2L driver. In system mode the input data comes from the C4 pad to the PAD input of the BAPF I/O cell. The data is fed through the canceller to the comparator and out the Z/ZN pin to the pfssr. EXTEST and mode_control are 0 which selects the midpoint voltage to the comparator to come from the common mode reference. The tri-state control for the driver is controlled by the TS pin which is driven by a boundary scan enable cell. In system mode the driver and receiver are enabled at the same time so the BSR enable is always 1. Thus providing simultaneous bidirectional signals. The RI and DI signals are tied to a 1.

One test mode, the Manufacturing LSSD test mode, uses a reduced pin count testing technique where only 64 pins are connected to the tester. All pins not connected to the tester need to be 'io-wrap' compatible, where the data is applied to the pad by the IO cell driver and wrapped back into the die through the IO cell receiver. For LSSD testing the mode_control signal is held to a 1 for two purposes. The first purpose is to provide a local input reference from the MIDBIAS circuit to the comparator. This way the common mode reference does not need to be relied on to be stable. The second purpose is to disable the canceller. With the canceller disabled the data from the pad flows directly through the canceller without being corrupted by the 'BIT' data from the driver. In LSSD testing the value of the Mode_B signal is controlled by the automatic test pattern generator (ATPG). Mode_B selects drive data from the BSR or the pfssd. The data is driven to the pad and captured in the BSR through the ZBSR signal and/or the pfssr through the comparator.

In yet another test mode, the JTAG EXTEST mode, the BAPF is treated as a single ended bidirectional pin. The RI and DI signals are tied to a 1 at the board level. This gives tri-state control to the BSR_ENAB circuit. When the EXTEST instruction is loaded in the jtag instruction register the EXTEST and Mode_B signals are active (1). The EXTEST signal causes the output impedance of the driver to remain at a mid-point value, disable the canceller, and select the complement reference value to come from the local MIDBIAS circuit. The Mode_B signal selects drive data to come from the BSR. The boundary scan patterns determines whether the pin should act as an input or output by loading the proper data into BSR_ENAB. If it's an output the driver is enabled by the BSR_ENAB and data from A1 is applied to PAD. If it's an input the driver is tri-stated by the BSR_ENAB and receive data on the PAD is captured in the BSR through the ZBSR path.

Figure 14:
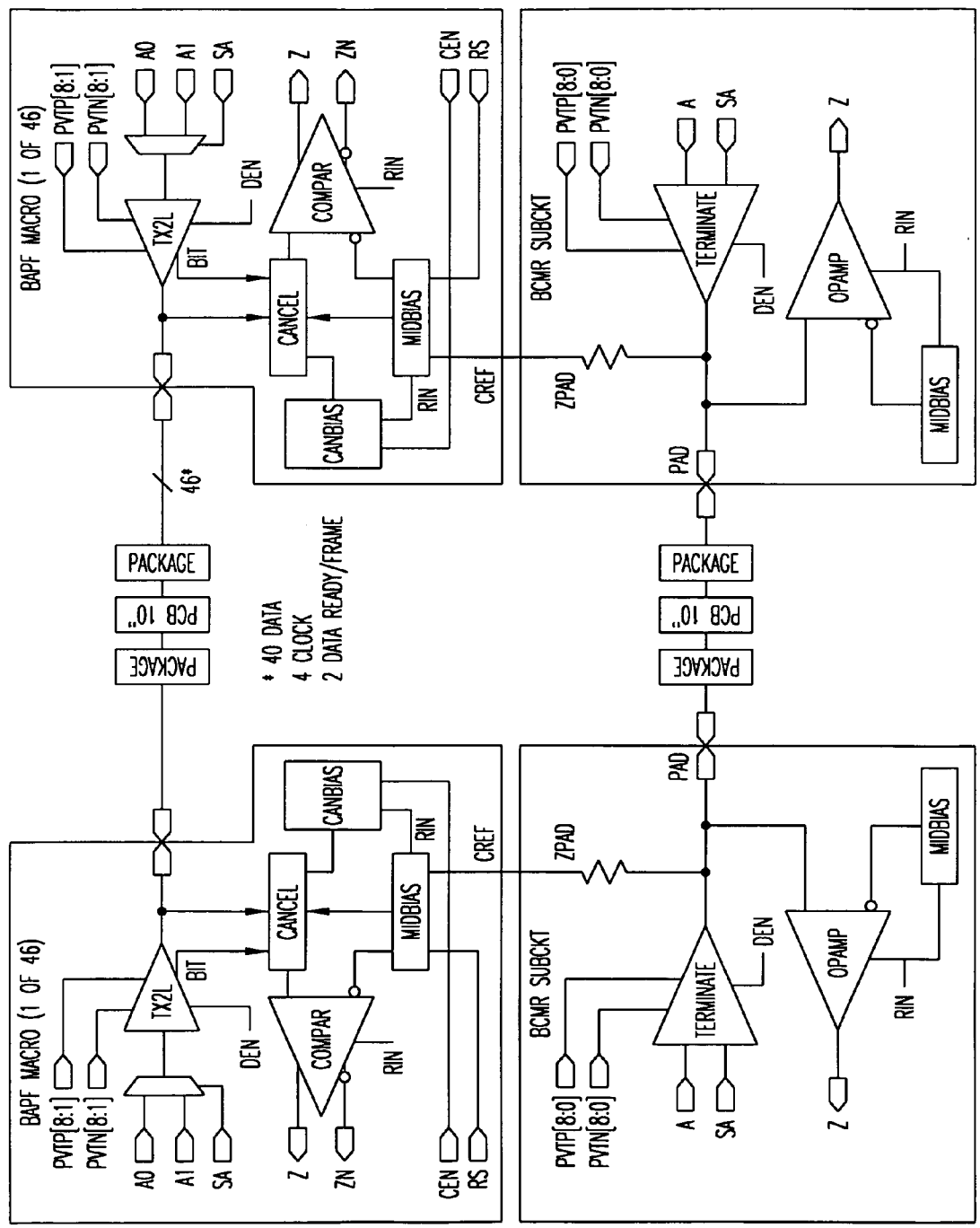
FIG. 14 is a diagram showing communications between single-ended signaling bidirectional drivers and receivers.

FIG. 14 is a schematic of the bidirectional single-ended channel. A single-ended port consists of 47 pins. In one embodiment, there are two groups of 20 data pins (80 signals/40 pins total), 2 data_ready/frame pins, 4 pins for the 2 complementary channel clocks, and 1 pin for the common mode reference voltage, which is forwarded with the data signals and is used to compensate for any ground differences which may exist between the driving and receiving devices. A total of 46 BAPF macros are used at each end of the channel to drive the 40 data lines, the 4 clock lines and the 2 data ready/frame lines. A BCMR macro is utilized to terminate each end of the common mode reference line. These BCMR macros distribute the reference voltage to each of the 46 BAPF macros at their respective ends of the channel.

Differential Signaling

The differential signaling format is binary NRZ (BNRZ). Two wires are used as a channel for each data bit in the bus, with true data placed on one of the wires, and complemented data placed on the second wire. (Unless otherwise stated, voltage values hereafter are referred to as differential voltages, measured on the true wire with respect to the complement wire.) Two data transmitters, fed by true and complement data and connected separately to the true and complement wires, are utilized for each data bit. Each transmitter has the same characteristics as those described for single-ended signaling. Consequently, for each transmitter operating, for example, into a quiescent termination to mid-rail, the observed voltage swing on each wire has nominal values of $V_{dd}/4$ and $3V_{dd}/4$. The corresponding differential values are $V_{dd}/2$ (true wire voltage=$3V_{dd}/4$, complement wire voltage=$V_{dd}/4$) and $-V_{dd}/2$ (true wire voltage=V dd/4, complement wire voltage=$3V_{dd}/4$). The positive voltage is utilized for a data 1, and the negative voltage is utilized for a data 0. For bidirectional signaling, the observed channel signal assumes nominal values of –V dd (Left and Right data both 0), 0 V (Left and Right opposite values), and V dd (Left and Right both 1). Differential signaling transmitters and receivers are required to communicate over differential, unidirectional channels. PFSSD/PFSSR transmitters sending signals to SSD/SSR receivers provide source termination nominally matched to the transmission line. SSD receivers also provide matched termination, the PFSSD/PFSSR transmitters produce nominal voltage levels on each wire of $V_{dd}/4$ and $3V_{dd}/4$ ($V_{dd}$ refers to the $V_{dd}$ used for PFSSD/PFSSR circuitry, nominally 1.8 V), corresponding to differential voltages of $\pm V_{dd}/2$. The positive voltage is utilized for a data 1 and the negative voltage is utilized for a data 0. PFSSD/PFSSR receivers provide a resistive termination nominally matched to the transmission line. This equivalent resistance is connected, on both true and complement input wires, to a quiescent voltage equal to $V_{dd}$ (1.8V) for operation in system mode, however in test mode, both true and complement inputs are terminated to ground. Single-ended voltage levels are approximately 1.8V and 1V in steady state, corresponding to differential values of ±0.8V. The positive value is used to represent data 1, and the negative value represents data 0. Proper termination, nominally matched to the transmission line, is provided by connection to a PFSSD/PFSSR transmitter. In order to accommodate variations due to process characteristics, voltage, and temperature, automatic setting of termination resistance is provided. This setting is updated periodically to provide tracking of variations. The BER for each channel, independently of mode of operation, data pattern, and data rate, does not exceed $10^{-7}$.

The two differential transmitters are non-inverting three-state CMOS output with digitally controlled AC and DC characteristics. Output levels are either 50-60 ohms to $V_{dd}$, 50-60 ohms to $V_{ss}$, or high impedance.

Figure 15:
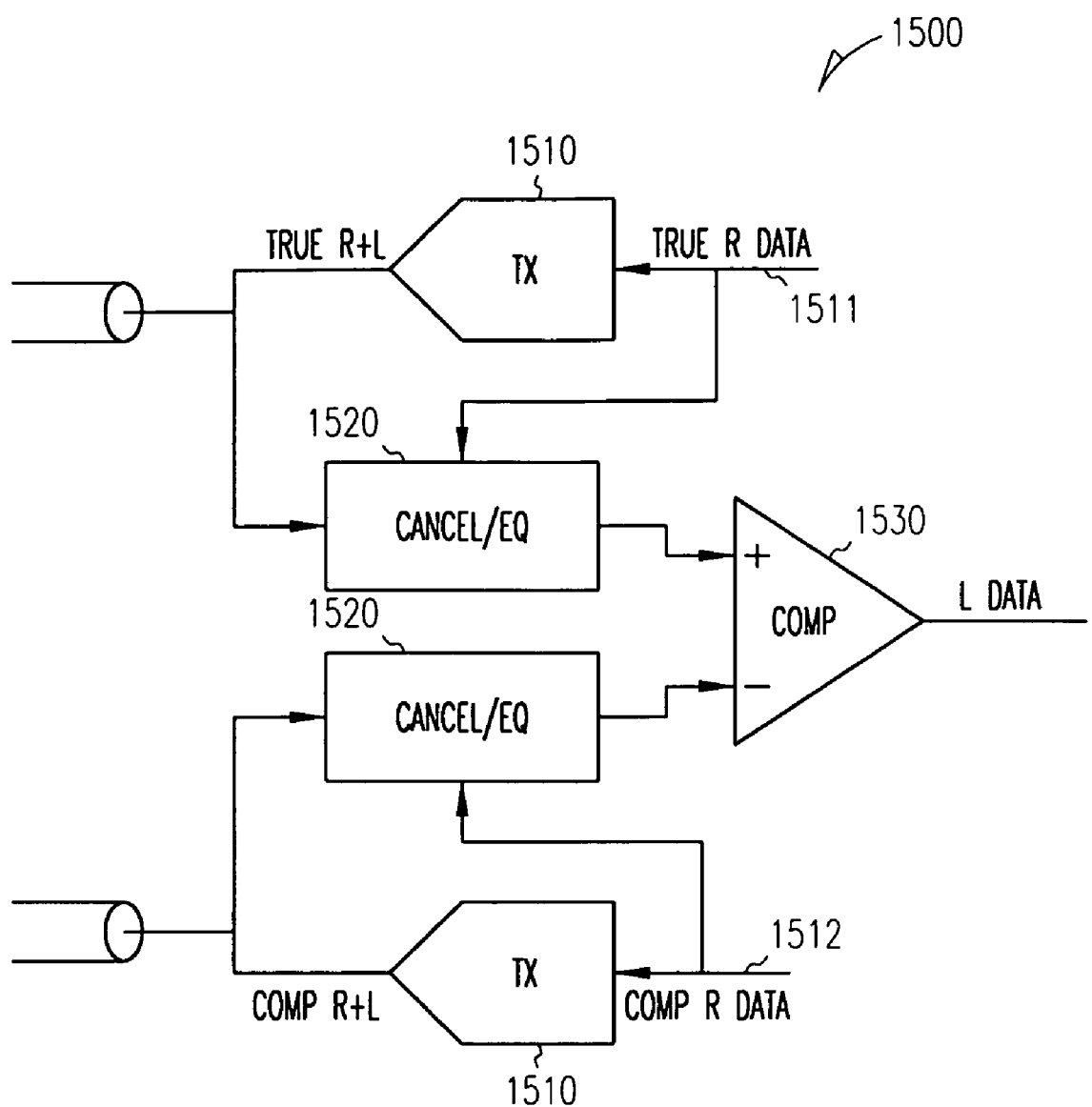
FIG. 15 is a diagram showing a differential signaling receiver.

FIG. 15 shows a schematic of a simplified differential receiver 1500. Each differential receiver consists of two terminators 1510, two canceller/equalizers 1520, and a comparator 1530. The termination function is implemented by the transmitters. Cancellation of the outgoing signal is accomplished in the canceller/equalizers 1520, leaving, ideally, only the incoming true 1511 and complement 1512 signals at the canceller/equalizer outputs. These signals are equalized and compared in the comparator 1530, which produces logic levels as input to the bit deskew delay line of the PFSSR. Each section of the receiver 1500 operates as described for single-ended receivers. Resistive loading of each single-ended channel by the canceller is no less than 1 KΩ. Capacitive loading is no greater than 0.1 pF. Noise induced by either canceller/equalizer 1520 onto a single-ended channel terminated at both ends does not exceed ±25 mV. The receiver 1500 accommodates a common-mode voltage offset of as much as ±250 mV. This voltage is defined as the difference in the ground potentials of the transmitter and receiver. Each canceller/equalizer 1520 incorporates equalization circuitry to mitigate channel transmission line effects. This equalization circuitry is the same as described for single-ended equalization.

Although the receiver module, depicted in FIG. 15, is intended primarily for bidirectional operation, operation in unidirectional mode is also be supported. In particular, both the transmitter and canceller/equalizer 1520 provide means to be independently disabled. Whenever the transmitter is disabled, its output resistance is at least 10 KΩ. Whenever the cancellers of the canceller/equalizers 1520 are disabled, their offsetting circuitry is non-functional, but the equalizer and amplifiers associated with each canceller/equalizer 1520 remain operational.

Figure 16:
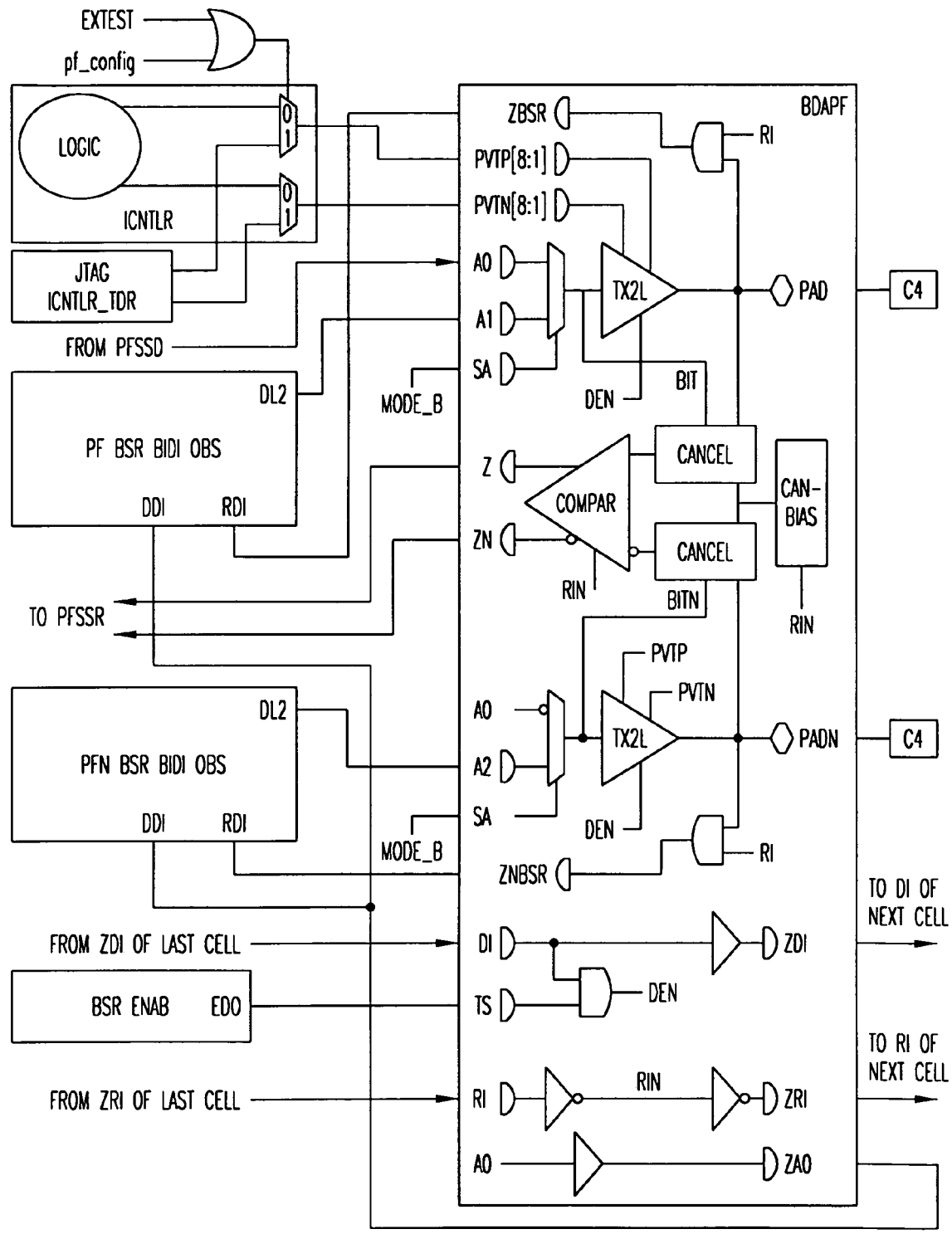
FIG. 16 is a block diagram showing a differential signaling driver/receiver I/O cell (BDAPF) with input and output signals.

FIG. 16 shows a differential driver/receiver I/O cell, called a BDAPF, and various signals utilized in testing. The connections to the BDAPF I/O cell are described below. The receiver inhibit input (RI) gates all non-test receivers during test mode to prevent unknown states from entering network. Receiver output set to "0" when RI is "0". Comparator output set to 0/1 differential when RI is "0". The driver inhibit input (DI) is used to tri-state drivers during test mode. The DI, RI signals are wired in a sequential daisy chain fashion around the die. The DI, RI inputs are driven from the ZDI, ZRI output of the previous I/O. The starting point of each chain comes from IBM specific receiver cells that are among the 64 test function pins. The pf_config bits are driven from a user defined test data register. These bits are configured when loading the appropriate TAP instruction and scanning in the intended bits. A 1 selects driver impedance from the icntlr test data register. This register is automatically set to a mid level after a JTAG reset. A 0 lets the ICNTLR function as intended as long as the EXTEST instruction is not loaded. The EXTEST signal is generated from the TAP instruction decoder. When the EXTEST instruction is loaded the EXTEST signal is 1, otherwise it's held at 0. The Mode_B signal is generated from the TAP instruction decoder. This signal is used to configure the Boundary Scan Registers for the various boundary scan functions. The Mode_B signal is held 0 in system mode.

In system mode the output data comes from the pfssd through the A0 input of both the TX2L drivers to the PAD and PADN. Mode_B is held at 0. The PVT impedance control bus is active and adjusts the output impedance of the TX2L driver. In system mode the input data comes from the C4 pad to the PAD input of the BDAPF I/O cell. The data is fed through the canceller to the differential comparator and out the Z and ZN pin to the pfssr. The tri-state control for the driver is controlled by the TS pin which is driven by a boundary scan enable cell. In system mode the driver and receiver are enabled at the same time so the BSR enable is always 1. Thus providing simultaneous bidirectional signals. The RI and DI signals are tied to a 1. The LT signals are tied to a 0.

One test mode, the Manufacturing LSSD test mode, uses a reduced pin count testing technique where only 64 pins are connected to the tester. All pins not connected to the tester need to be 'io-wrap' compatible, where the data is applied to the pad by the IO cell driver and wrapped back into the die through the IO cell receiver. In LSSD test mode each side of the differential driver is treated as a single ended bidirectional pin. In LSSD testing the value of the Mode_B signal is controlled by the automatic test pattern generator (ATPG). Mode_B selects drive data from the BSR or the pfssd. The data is driven to the pad and captured in the BSR through the ZBSR signal and/or the pfssr through the comparator.

In yet another test mode, the JTAG EXTEST mode, each side of the differential BDAPF is treated as a single ended bidirectional pin. The RI and DI signals are tied to a 1 at the board level. This gives tri-state control to the BSR_ENAB circuit. When the EXTEST instruction is loaded in the jtag instruction register the EXTEST and Mode_B signals are active (1). The EXTEST signal causes the output impedance of the driver to remain at a mid-point value, and disable the canceller. The Mode_B signal selects drive data to come from the BSR. The boundary scan patterns determine whether the pin should act as an input or output by loading the proper data into BSR_ENAB. If it's an output the driver is enabled by the BSR_ENAB and data from A1 is applied to PAD. If it's and input the driver is tri-stated by the BSR_ENAB and receive data on the PAD and PADN is captured in the BSR through the ZBSR and ZNBSR paths.

Figure 17:
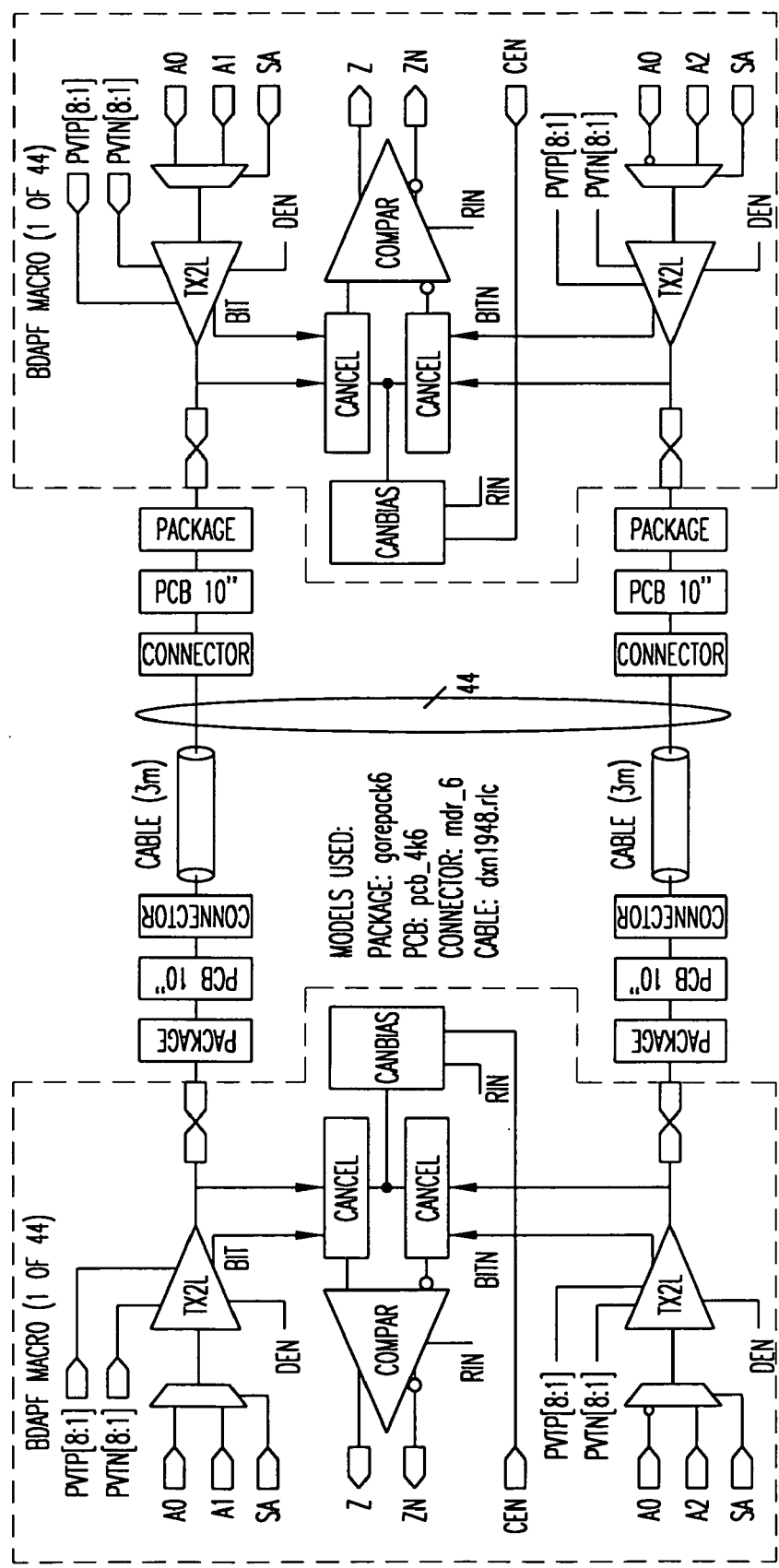
FIG. 17 is a diagram showing communications between differential signaling bidirectional drivers and receivers.

FIG. 17 is a schematic of the bi-directional differential channel. A differential port consists of 88 pins for 80 data lines, 4 clock lines, and 4 data ready/frame lines. A total of 44 BDAPF macros are used at each end of the channel to drive the lines. The differential ports may be used for communications between devices on a single brick, or for cabled links to devices on other bricks in the system.

Representative Data Rates and Channel Characteristics

In one embodiment, supported data rates for some given lengths and types of channels are as follows: 1600 Mb/s/signal for 10" printed circuit board (PCB) if signaling is bidirectional and single-ended; 1600 Mb/s/signal for 16" PCB+3m cable if signaling is bidirectional and differential; 800 Mb/s/signal for 16" PCB+3m cable if signaling is unidirectional and differential, likewise for 16" PCB+5m cable. However, it can be appreciated by those skilled in the art that supported data rates can vary within logical bounds and still fit within the scope and breadth of the present invention. Furthermore, any channel interconnects for data lines are not conceptually limited in width or type. Various interconnect types include Ethernet, microstrip, glass, twisted pair or any other type of waveguide. Details of specific embodiments of package, PCB, and cable/connector requirements are included below.

The PCB characteristic impedance for single ended channel PCB traces should be 55±10%, and for differential channel PCB trances, should be 110±10%. Length matching of PCB nets is also required to reduce skew. The PCB length should be matched to within 50 mils for all nets within a data channel. PFSSR bit deskew circuitry can compensate for 3 bit times of skew for PFSSD/R to PFSSD/R communication, and 1 bit time of skew for SSD/R to PFSSD/R communications. The channel clock net requires a quadrature shift from padding of 4.0" on the transmit side (clock signals are unidirectional) for a negative clock launch out of the PFSSD. The dc resistance of the PCB can be minimized by plating signal layers up from half-ounce copper 0.7 mil in thickness to 1.0 mil in thickness. The PCB should be routed to avoid resonant lengths between two connected devices on the same PCB. These are the lengths at which a data bit has time to propagate down to the load and return to the driver at the time the next data bit is being sent.

Figure 18:
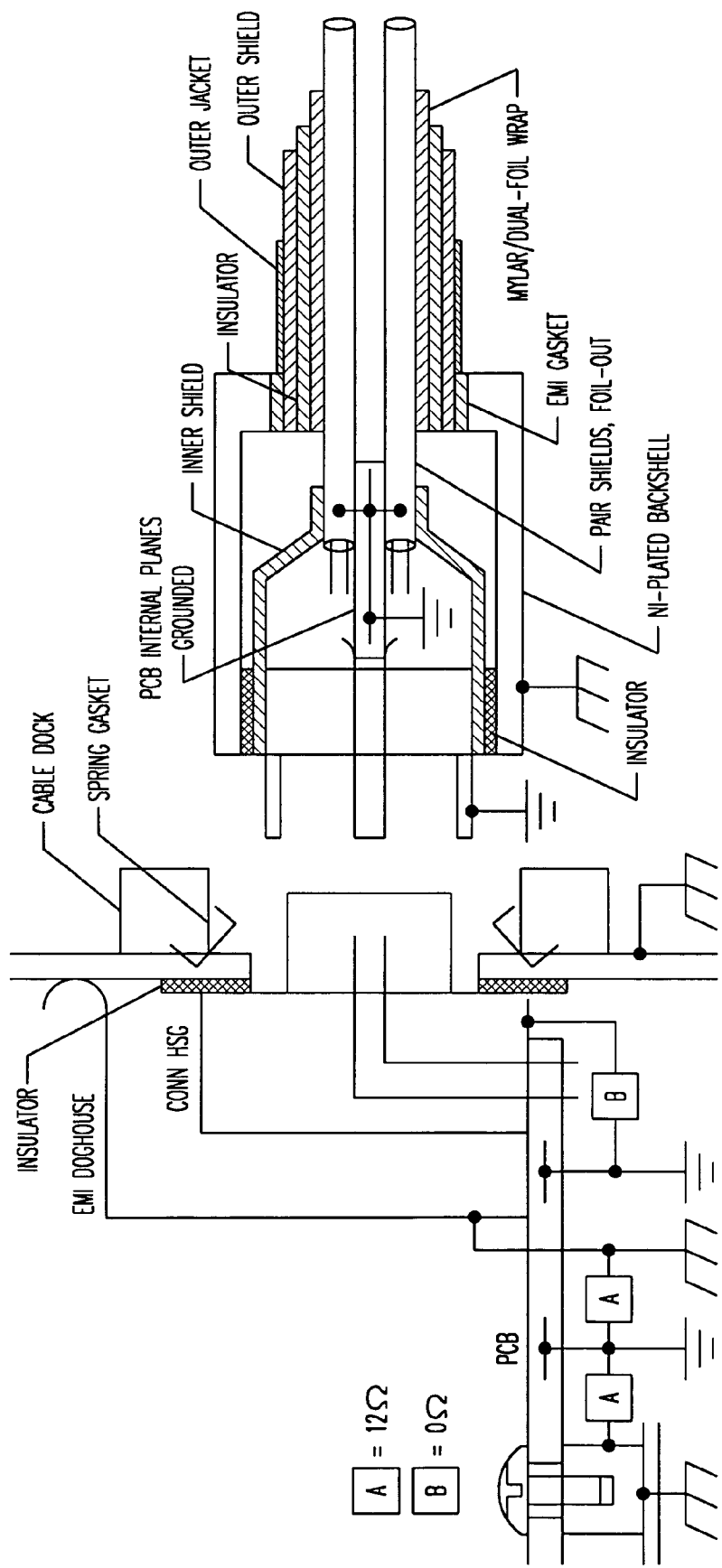
FIG. 18 is a diagram showing signal grounding for a differential signaling cable connector.

FIG. 18 shows an exemplary grounding scheme called isolated grounding. Use of cable should utilize isolated grounding over other methods of grounding, such as common grounding, because the present invention will most likely require AC coupling of a network interconnect for distances of 5 meters or greater. AC coupling may be necessary to isolate the ground planes between modules/systems, especially if the voltage differential between interconnected modules exceeds 250 mV. In order to enable AC coupling of the signals, the port will have to be switched into the encoding mode of operation. In this mode the data will be encoded using an 8B/9B encoding scheme. This will in turn reduce the data throughput rate by a factor of 8/9.

The above detailed description is illustrative. It is not intended to be restrictive. Upon review of the above detailed description, one skilled in the art will no doubt see many other embodiments within the full scope and nature of the invention. Therefore, the full scope of the invention should be construed only in reference to the language of the claims and all equivalents thereof.

What is claimed is:
1. A communication channel comprising:
   a link level protocol having an input/output, a driver line and a receiver line;
   a driver connected to the driver line, wherein the driver includes a driver output, a driver circuit, and an impedance control circuit, wherein the impedance control circuit includes an impedance control output connected to the driver circuit, and wherein the impedance control circuit modifies a driver output signal as a function of an external signal;

a canceller/equalizer connected to the driver line and the driver output, wherein the canceller/equalizer includes a canceller/equalizer output, and wherein the canceller/equalizer generates a receive signal as a function of data on the driver line and the driver output; and a receiver connected to the receiver line and the canceller/equalizer output.

2. The communication channel of claim 1 wherein the external signal is the temperature of a resistive circuit.

3. The communication channel of claim 1, wherein the impedance control circuit increases voltage swing of the driver output signal to compensate for an increase in temperature at the driver.

4. A communication channel comprising:
a link level protocol having an input/output, a driver line and a receiver line;
a driver connected to the driver line, wherein the driver includes a driver output;
a canceller/equalizer connected to the driver line and the driver output, wherein the canceller/equalizer includes a canceller/equalizer output, and wherein the canceller/equalizer generates a receive signal as a function of data on the driver line and the driver output; and
a receiver connected to the receiver line and the canceller/equalizer output, wherein the receiver includes a receiver circuit and a bit deskew circuit, wherein the bit deskew circuit deskews signals from the receiver circuit as a function of a clock signal.

5. The communication channel of claim 4 wherein the receiver further comprising a clock receiver, wherein the clock receiver has a clock receiver output connected to the bit deskew circuit, and wherein the clock receiver receives the clock signal and centers the clock.

6. A communication channel comprising:
a link level protocol having an input/output, a driver line and a receiver line;
a driver connected to the driver line, wherein the driver includes a driver output, a driver circuit, and an impedance control circuit, wherein the impedance control circuit includes an impedance control output connected to the driver circuit, and wherein the impedance control circuit modifies a driver output signal as a function of an external signal;
a canceller/equalizer connected to the driver line and the driver output, wherein the canceller/equalizer includes a canceller/equalizer output, and wherein the canceller/equalizer generates a receive signal as a function of data on the driver line and the driver output; and
a receiver connected to the receiver line and the canceller/equalizer output, wherein the receiver includes a receiver circuit and a bit deskew circuit, wherein the bit deskew circuit deskews signals from the receiver circuit as a function of a clock signal.

7. The communication channel of claim 6 wherein the external signal is a voltage across a resistive circuit.

8. The communication channel of claim 6 wherein the receiver further comprising a clock receiver, wherein the clock receiver has a clock receiver output connected to the bit deskew circuit, and wherein the clock receiver receives the clock signal and centers the clock.

9. The communication channel of claim 6, wherein the impedance control circuit increases voltage swing of the driver output signal to compensate for an increase in temperature at the driver.

10. A communications system, comprising:
a communications medium;
a plurality of processors including a first and second processor, wherein each processor includes at least one processor line;
a first transceiver connected to the first processor and to the communications medium, wherein the first transceiver comprises a link level protocol, a driver including a driver output, a driver circuit and an impedance control circuit, a canceller/equalizer, and a receiver; and
a second transceiver connected to the second processor and to the communications medium, wherein the second processor communicates with the first processor over the communications medium;
wherein the link level protocol includes an input/output, a driver line and a receiver line;
wherein the driver is connected to the driver line, wherein the impedance control circuit includes an impedance control output connected to the driver circuit, and wherein the impedance control circuit modifies a driver output signal as a function of an external signal;
wherein the canceller/equalizer is connected to the driver line and the driver output, wherein the canceller/equalizer includes a canceller/equalizer output, and wherein the canceller/equalizer generates a receive signal as a function of data on the driver line and the driver output; and
wherein the receiver is connected to the receiver line and the canceller/equalizer output.

11. The communications system of claim 10 wherein the external signal is based on temperature of a resistive circuit.

12. The communications system of claim 10 wherein the external signal is a function of a voltage across a resistive circuit.

13. The communications system of claim 10, wherein the impedance control circuit increases voltage swing of the driver output signal to compensate for an increase in temperature at the driver.

14. A communications system comprising:
a communications medium;
a plurality of processors including a first and second processor, wherein each processor includes at least one processor line;
a first transceiver connected to the first processor and to the communications medium, wherein the first transceiver comprises a link level protocol, a driver including a driver output, a driver circuit and an impedance control circuit, a canceller/equalizer, and a receiver including a receiver circuit and a bit deskew circuit; and
a second transceiver connected to the second processor and to the communications medium, wherein the second processor communicates with the first processor over the communications medium;
wherein the link level protocol includes an input/output, a driver line and a receiver line;
wherein the driver is connected to the driver line, wherein the impedance control circuit includes an impedance control output connected to the driver circuit, and wherein the impedance control circuit modifies a driver output signal as a function of an external signal;
wherein the canceller/equalizer is connected to the driver line and the driver output, wherein the canceller/equalizer includes a canceller/equalizer output, and wherein the canceller/equalizer generates a receive signal as a function of data on the driver line and the driver output; and wherein the receiver is connected to the receiver line and the canceller/equalizer output, wherein the bit deskew circuit deskews signals from the receiver circuit as a function of a clock signal.

15. The communications system of claim 14 wherein the external signal is based on temperature of a resistive circuit.

16. The communications system of claim 14 wherein the receiver further comprising a clock receiver, wherein the clock receiver has a clock receiver output connected to the bit deskew circuit, and wherein the clock receiver receives the clock signal and centers the clock.

17. The communications system of claim 14 wherein the external signal is a function of a voltage across a resistive circuit.

18. The communications system of claim 14, wherein the impedance control circuit increases voltage swing of the driver output signal to compensate for an increase in temperature at the driver.

19. A communications system, comprising:
a communications medium;
a processor with at least one processor line; and
a transceiver connected to the processor and to the communications medium, wherein the transceiver comprises a link level protocol, a driver including a driver output, a driver circuit and an impedance control circuit, a canceller/equalizer, and a receiver;
wherein the link level protocol includes an input/output, a driver line and a receiver line;
wherein the driver is connected to the driver line, wherein the impedance control circuit includes an impedance control output connected to the driver circuit, and wherein the impedance control circuit modifies a driver output signal as a function of an external signal;
wherein the canceller/equalizer is connected to the driver line and the driver output, wherein the canceller/equalizer includes a canceller/equalizer output, and wherein the canceller/equalizer generates a receive signal as a function of data on the driver line and the driver output; and
wherein the receiver is connected to the receiver line and the canceller/equalizer output.

20. The communications system of claim 19 wherein the external signal is based on temperature of a resistive circuit.

21. The communications system of claim 19 wherein the external signal is a function of a voltage across a resistive circuit.

22. The communications system of claim 19, wherein the impedance control circuit increases voltage swing of the driver output signal to compensate for an increase in temperature at the driver.

23. A communications system, comprising:
a communications medium;
a processor with at least one processor line; and
a transceiver connected to the processor and to the communications medium, wherein the transceiver comprises a link level protocol, a driver including a driver output, a driver circuit and an impedance control circuit, a canceller/equalizer, and a receiver including a receiver circuit and a bit deskew circuit;
wherein the link level protocol includes an input/output, a driver line and a receiver line;
wherein the driver is connected to the driver line, wherein the impedance control circuit includes an impedance control output connected to the driver circuit, and wherein the impedance control circuit modifies a driver output signal as a function of an external signal;
wherein the canceller/equalizer is connected to the driver line and the driver output, wherein the canceller/equalizer includes a canceller/equalizer output, and wherein the canceller/equalizer generates a receive signal as a function of data on the driver line and the driver output; and
wherein the receiver is connected to the receiver line and the canceller/equalizer output, wherein the bit deskew circuit deskews signals from the receiver circuit as a function of a clock signal.

24. The communications system of claim 23 wherein the external signal is based on temperature of a resistive circuit.

25. The communications system of claim 23 wherein the receiver further comprising a clock receiver, wherein the clock receiver has a clock receiver output connected to the bit deskew circuit, and wherein the clock receiver receives the clock signal and centers the clock.

26. The communications system of claim 23 wherein the external signal is a function of a voltage across a resistive circuit.

27. The communications system of claim 23, wherein the impedance control circuit increases voltage swing of the driver output signal to compensate for an increase in temperature at the driver.

* * * * *

UNITED STATES PATENT AND TRADEMARK OFFICE
CERTIFICATE OF CORRECTION

PATENT NO.        : 7,248,635 B1
APPLICATION NO.   : 09/620373
DATED             : July 24, 2007
INVENTOR(S)       : Arneson et al.

It is certified that error appears in the above-identified patent and that said Letters Patent is hereby corrected as shown below:

TITLE PAGE, ITEM (56)
On page 2, in field (56), under "Other Publications", in column 2, line 7, delete "Brandwidth" and insert -- Bandwidth --, therefor.

TITLE PAGE, ITEM (56)
On page 2, in field (56), under "Other Publications", in column 2, line 18, delete "Transger" and insert -- Transfer --, therefor.

TITLE PAGE, ITEM (56)
On page 2, in field (56), under "Other Publications", in column 2, line 30, delete "Achritecture" and insert -- Architecture --, therefor.

TITLE PAGE, ITEM (56)
On page 2, in field (56), under "Other Publications", in column 2, line 36, delete "ambedded" and insert --embedded --, therefor.

In column 6, line 23, delete "clk_1 710" and insert -- clk_I 710 --, therefor.

In column 6, line 36, delete "clk_1710" and insert -- clk_I 710 --, therefor.

In column 6, line 43, delete "data_ready out" and insert -- data_ready_out --, therefor.

In column 7, lines 31-32, delete "clk_1 710" and insert -- clk_I 710 --, therefor.

In column 7, line 35, delete "clk_1710" and insert -- clk_I 710 --, therefor.

In column 7, line 36, delete "10" and insert -- IO --, therefor.

In column 13, line 60, delete "PathFoward" and insert -- PathForward --, therefor.

UNITED STATES PATENT AND TRADEMARK OFFICE
CERTIFICATE OF CORRECTION

PATENT NO. : 7,248,635 B1
APPLICATION NO. : 09/620373
DATED : July 24, 2007
INVENTOR(S) : Arneson et al.

It is certified that error appears in the above-identified patent and that said Letters Patent is hereby corrected as shown below:

In column 18, line 39, delete "KQ" and insert -- K$\Omega$ --, therefor.

Signed and Sealed this

Twenty-third Day of October, 2007

JON W. DUDAS
*Director of the United States Patent and Trademark Office*